(12) United States Patent
Yonaha

(10) Patent No.: US 8,218,025 B2
(45) Date of Patent: Jul. 10, 2012

(54) IMAGE CAPTURING APPARATUS, IMAGE CAPTURING METHOD, AND COMPUTER PROGRAM PRODUCT

(75) Inventor: Makoto Yonaha, Kanagawa (JP)

(73) Assignee: Fujifilm Corporation, Tokyo (JP)

(*) Notice: Subject to any disclaimer, the term of this patent is extended or adjusted under 35 U.S.C. 154(b) by 1134 days.

(21) Appl. No.: 12/031,554

(22) Filed: Feb. 14, 2008

(65) Prior Publication Data

US 2008/0198247 A1 Aug. 21, 2008

(30) Foreign Application Priority Data

Feb. 15, 2007 (JP) .................................. 2007-034911
Feb. 1, 2008 (JP) .................................. 2008-023248

(51) Int. Cl.
*H04N 5/91* (2006.01)
(52) U.S. Cl. ................ 348/222.1; 348/208.15; 348/143; 382/232
(58) Field of Classification Search .................. 348/143, 348/152, 153, 154, 155, 208.14, 231.99, 348/231.3
See application file for complete search history.

(56) References Cited

U.S. PATENT DOCUMENTS

| | | | | |
|---|---|---|---|---|
| 7,023,469 B1 * | 4/2006 | Olson | ............................ | 348/152 |
| 7,123,745 B1 * | 10/2006 | Lee | ............................... | 382/103 |
| 7,423,669 B2 * | 9/2008 | Oya et al. | ................. | 348/208.14 |
| 7,570,281 B1 * | 8/2009 | Ono | ............................... | 348/135 |
| 2006/0115235 A1 | 6/2006 | Takikawa et al. | | |

FOREIGN PATENT DOCUMENTS

| | | |
|---|---|---|
| JP | 2003-008869 | 1/2003 |
| JP | 2003-249982 A | 9/2003 |
| JP | 2004-23734 A | 1/2004 |
| JP | 2004-200989 A | 7/2004 |
| JP | 2004-328747 | 11/2004 |
| JP | 2006-109119 A | 4/2006 |

OTHER PUBLICATIONS

Japanese Office Action dated Nov. 15, 2011, for Japanese Application No. 2008-023248.
JP Office Action issued in corresponding JP application No. 2008-023248 dated May 8, 2012.

* cited by examiner

*Primary Examiner* — David Ometz
*Assistant Examiner* — Dwight C Tejano
(74) *Attorney, Agent, or Firm* — Birch, Stewart, Kolasch & Birch, LLP

(57) ABSTRACT

Provided is an image capturing apparatus capable of outputting an image in a form displayable by a display apparatus, while making use of a space resolution and a temporal resolution of a captured image. A monitoring system includes an image capturing section that captures an image; an output image generating section that generates an output image from the image captured by the image capturing section; a matching determining section that determines whether an object that matches a predetermined condition exists in the image captured by the image capturing section; and an output section that outputs, by embedding in the output image, an image of a subject indicated by the object having a data amount larger than a data amount of an image of the object in the output image.

23 Claims, 14 Drawing Sheets

| LOWER LIMIT VALUE | AREA OF PERSON | MOTION SPEED | AREA OF CHANGE REGION | AREA OF PARTICULAR COLOR | FORM MATCHING LEVEL | DIRECTION MATCHING LEVEL |
|---|---|---|---|---|---|---|
| | S1 | V1 | Sα | Sβ | Sγ | md |

FIG. 8

IMAGE CAPTURING APPARATUS, IMAGE CAPTURING METHOD, AND COMPUTER PROGRAM PRODUCT

CROSS REFERENCE TO RELATED APPLICATIONS

The present application claims priority from Japanese Patent Applications No. 2007-034911 filed on Feb. 15, 2007, and No. 2008-023248 filed on Feb. 1, 2008, the contents of which are incorporated herein by reference.

BACKGROUND

1. Technical Field

The present invention relates to an image capturing apparatus, an image capturing method, and a computer program product. In particular, the present invention relates to an image capturing apparatus, an image capturing method, and a computer program product having computer instructions recorded on a computer readable medium.

2. Description of the Related Art

Such image capturing apparatuses are already known as, while the motion vector detected in the motion image compression section is less than a predetermined value, lowering the image capturing frame rate for the image capturing section by relatively lengthening the period of synchronization signals to be supplied to the image capturing section, and, while the motion vector is more than or equal to the predetermined value, raising the frame rate by relatively shortening the period of synchronization signals (e.g. Patent Document 1).

[Patent Document 1] Japanese Patent Application Publication No. 2004-200989

SUMMARY

The image capturing apparatus recited in the Patent Document 1 is able to perform image capturing at low frame rate while no motion has been detected, and when a motion more than or equal to a predetermined value is detected from an image of a low frame rate under image capturing, to raise the frame rate or the resolution for the image capturing. However, even if such an image capturing apparatus capable of performing image capturing with high resolution and high frame rate as is disclosed in the Patent Document 1 is introduced, the merit will not be taken advantage of if a display apparatus cannot display an image of the high resolution and the high frame rate having captured by the image capturing apparatus. However, introduction of a display apparatus, in addition to an image capturing apparatus having a high performance, which corresponds to the image capturing apparatus raises the cost for the entire monitoring system.

Therefore, it is an object of an aspect of the innovations herein to provide an image capturing apparatus, an image capturing method, and a recording medium storing thereon a program which are capable of overcoming the above drawbacks accompanying the related art. The above and other objects can be achieved by combinations described in the independent claims. The dependent claims define further advantageous and exemplary combinations of the innovations herein.

Therefore, in the first aspect related to the innovations herein, one exemplary image capturing apparatus includes: an image capturing section that captures an image; an output image generating section that generates an output image from the image captured by the image capturing section; a matching determining section that determines whether an object that matches a predetermined condition exists in the image captured by the image capturing section; and an output section that outputs, by embedding in the output image, an image of a subject indicated by the object having a data amount larger than a data amount of an image of the object in the output image, when the matching determining section has determined that an object that matches the condition exists.

An arrangement is also possible which further includes an object region specifying section that, when the matching determining section has determined that an object that matches the condition exists, specifies an object region including the object that matches the condition, in the image captured by the image capturing section, where the output image generating section includes: a small data amount image generating section that generates a small data amount image by reducing a data amount of the image captured by the image capturing section, and the output section, when the matching determining section has determined that an object that matches the condition exists, embeds the image of the object region in the image captured by the image capturing section to the small data amount image, and outputs the embedded result.

Furthermore, the small data amount image generating section may generate a low resolution image by reducing a resolution of the image captured by the image capturing section, and the output section, when the matching determining section has determined that an object that matches the condition exists, may embed the image of the object region to the low resolution image generated by the small data amount image generating section, and outputs the embedded result.

Furthermore, the small data amount image generating section may generate a low gray scale image by reducing a gray scale of the image captured by the image capturing section, and the output section, when the matching determining section has determined that an object that matches the condition exists, may embed the image of the object region to the low gray scale image generated by the small data amount image generating section, and outputs the embedded result.

An arrangement is also possible which further includes: an embedded image obtaining section that, when the matching determining section has determined that an object that matches the condition exists, obtains an image of a subject that has a data amount larger than a data amount of the image of the object that matches the condition and is indicated by the object that matches the condition, where the output section, when the matching determining section has determined that an object that matches the condition exists, embeds the image obtained by the embedded image obtaining section to the image captured by the image capturing section, and outputs the embedded result.

An arrangement is also possible which further includes an embedded image capturing section that, when the matching determining section has determined that an object that matches the condition exists, captures an image of a subject that has a data amount larger than a data amount of the image of the object that matches the condition and is indicated by the object that matches the condition, where the embedded image obtaining section, when the matching determining section has determined that an object that matches the condition exists, obtains the image captured by the embedded image capturing section.

Furthermore, the embedded image obtaining section, when the matching determining section has determined that an object that matches the condition exists, may obtain an image of a subject that has an image quality higher than an image quality of an image of the object that matches the condition and is indicated by the object that matches the condition.

In the second aspect related to the innovations herein, one exemplary image capturing method includes: an image capturing step of capturing an image; an output image generating step of generating an output image from the image captured in the image capturing step; a matching determining step of determining whether an object that matches a predetermined condition exists in the image captured in the image capturing step; and an output step of outputting, by embedding in the output image, an image of a subject indicated by the object having a data amount larger than a data amount of an image of the object in the output image, when an object that matches the condition is determined to exist in the matching determining step.

In the third aspect related to the innovations herein, one exemplary computer program product having computer instructions, recorded on a computer readable medium, for enabling a computer executing the computer instructions to cause the image capturing apparatus to function as: an image capturing section that captures an image; an output image generating section that generates an output image from the image captured by the image capturing section; a matching determining section that determines whether an object that matches a predetermined condition exists in the image captured by the image capturing section; and an output section that outputs, by embedding in the output image, an image of a subject indicated by the object having a data amount larger than a data amount of an image of the object in the output image, when the matching determining section has determined that an object that matches the condition exists.

The summary of the invention does not necessarily describe all necessary features of the present invention. The present invention may also be a sub-combination of the features described above.

According to the innovations herein, it becomes possible to provide an image capturing apparatus capable of outputting an image displayable by a display apparatus, while taking advantage of the space resolution and the time resolution of a captured image.

BRIEF DESCRIPTION OF THE DRAWINGS

FIG. 8 shows one example of a condition stored in a condition storing section 250.

DESCRIPTION OF EXEMPLARY EMBODIMENTS

The invention will now be described based on the preferred embodiments, which do not intend to limit the scope of the present invention, but exemplify the invention. All of the features and the combinations thereof described in the embodiment are not necessarily essential to the invention.

Figure 1:
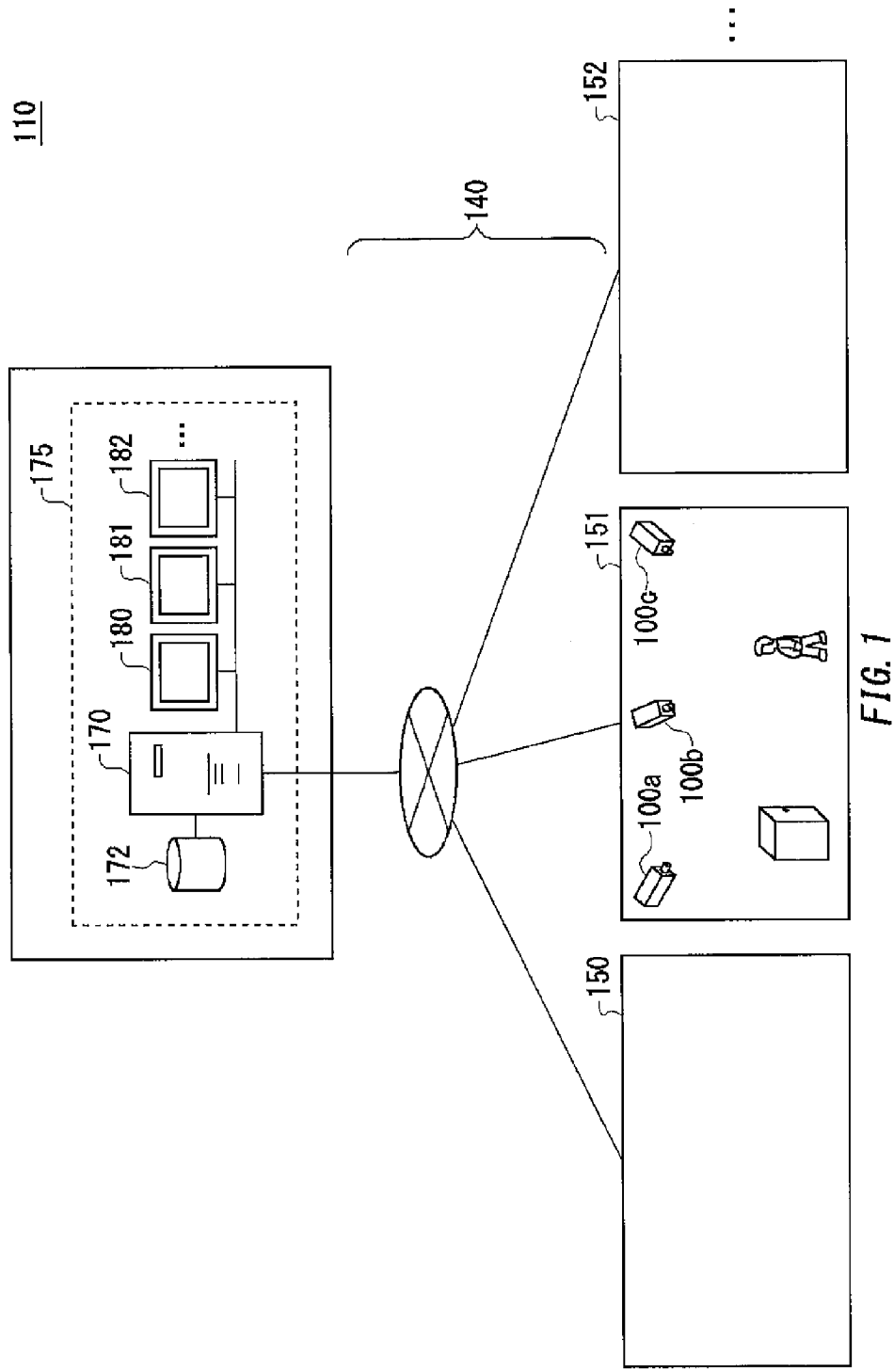
FIG. 1 shows one example of a usage environment of a monitoring system 110.

FIG. 1 shows one example of a usage environment of a monitoring system 110, according to an embodiment. The monitoring system 110 includes a plurality of image capturing apparatuses 100a-c, a transmission path 140, and a display apparatus 175. The display apparatus 175 includes a display control apparatus 170, a recording apparatus 172, and a plurality of monitors 180, 181, 182, . . . . Note that although not illustrated in the drawing, the image capturing apparatuses 100a-c are provided for a plurality of monitor regions 150, 151, 152, . . . respectively, for capturing images of a plurality of monitor regions 150, 151, 152, . . . . Hereinafter, each of the image capturing apparatuses 100a-c provided for the plurality of monitor regions 150, 151, 152, . . . is collectively referred to as "image capturing apparatus 100".

The image capturing apparatus 100 transmits a motion image resulting from capturing images of the monitor regions 150, 151, 152, . . . , to the display control section 170 via the transmission path 140. The display control apparatus 170 causes the monitors 180, 181, 182, . . . to display the motion images received from the image capturing apparatus 100. The monitors 180, 181, 182, . . . display the motion images of the monitor regions 150, 151, 152, . . . respectively.

The image capturing apparatus 100 captures the motion image of the monitor region 151, by capturing the frame image of a higher resolution than the monitor resolution displayable by the monitors 180, 181, 182 . . . , at a higher frame rate than the monitor display rate being the display rate at which at the motion image displayable by the monitors 180, 181, 182 . . . . Then while -a person's face is not detected in the captured motion image, the image capturing apparatus 100 keeps converting the captured motion image into a motion image in which a frame image having a resolution of the monitor resolution or lower is displayable at a rate of the monitor display rate or lower, and transmitting the result to the display control apparatus 170. The display control apparatus 170 controls the monitors 180, 181, 182, . . . to display the motion image received from the image capturing apparatus 100 as it is.

Then when a person's face is detected in the motion image, the image capturing apparatus 100 embeds the face image of a person in the frame image having a resolution higher than the monitor resolution included in the captured motion image, in the motion image to be transmitted, by means of digital watermarking. The display control apparatus 170 extracts the face image embedded by means of digital watermarking to the motion image received from the image capturing apparatus 100, and records the same to the recording apparatus 172. The display control apparatus 170 causes the monitors 180, 181, 182, . . . to display the display the motion image received from the image capturing apparatus 100 after superposing thereto an indication that the face image of a high resolution is included therein. Then when having received an instruction to display the face image from a surveyor, the display control apparatus 170 controls the monitors 180, 181, 182, . . . to perform enlarged display of the face image recorded in the recording apparatus 172.

As explained above, according to the monitoring system 110, the image capturing apparatus 100 converts a motion image captured at a higher resolution and a higher frame rate than the monitor resolution and the monitor display rate, into a motion image of the monitor resolution and the monitor display rate, and transmits the same to the display control apparatus 170. Then when having detected a face of a person, the image capturing apparatus 100 embeds the face image of the person to the motion image to be transmitted, by means of digital watermarking. Accordingly, even when the monitors 180, 181, 182, . . . display the motion image transmitted from the image capturing apparatus 100 as it is, the surveyor is able to monitor the motion image without a feeling of strangeness. In addition, by causing the display control apparatus 170 to extract a face image and record the face image to the recording apparatus 172, a surveyor is able to later confirm the face image of a high resolution in the monitors 180, 181, 182, . . . . Therefore according to the monitoring system 110, even when an image capturing apparatus 100 having a high resolution and a high frame rate is newly introduced, existing monitors 180, 181, 182, . . . and an existing transmission path 140 are able to be used as they are, and so it makes it easy for a user to introduce an image capturing apparatus 100 having a high image capturing capability.

Note that the monitor regions 150, 151, 152, . . . may be a space in different buildings from each other, or a different space from each other in a same building. For example, the monitor regions 150, 151, 152, . . . may be a passage between display shelves in a shop. It is also needless to say that the monitor regions 150, 151, 152, . . . may be an open space not surrounded by any building, not limited to a space within a building.

Figure 2:
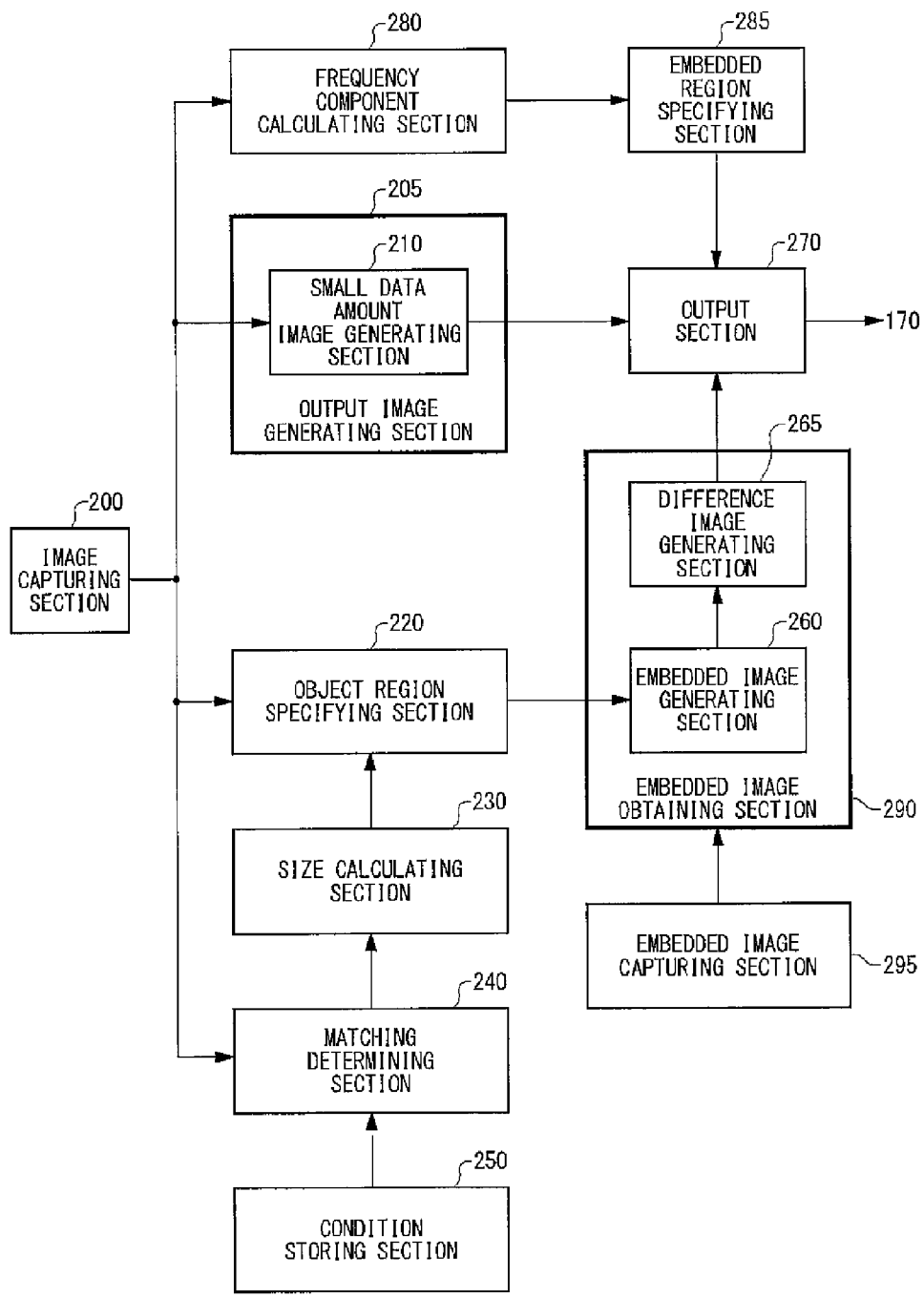
FIG. 2 shows one example of a block configuration of an image capturing apparatus 100.

FIG. 2 shows one example of a block configuration of an image capturing apparatus 100. The image capturing apparatus 100 includes an image capturing section 200, an output image generating section 205, an object region specifying section 220, a size calculating section 230, a matching determining section 240, a condition storing section 250, an embedded image obtaining section 290, an embedded image capturing section 295, an output section 270, a frequency component calculating section 280, and an embedded region specifying section 285. The output image generating section 205 includes a small data amount image generating section 210. The embedded image generating section 290 includes an embedded image generating section 260 and a difference image generating section 265.

The image capturing section 200 captures an image. Then the output image generating section 205 generates an output image from an image captured by the image capturing section 200. Specifically, the small data amount image generating section 210 generates a small data amount image (one example of an output image), by reducing the data amount of the image captured by the image capturing section 200. More specifically, the small data amount image generating section 210 generates a small data amount image less than or equal to a predetermined data amount, by reducing the data amount of the image captured by the image capturing section 200. Note that the data amount in the present embodiment means an information amount as image information.

Then the matching determining section 240 determines whether there exists an object that matches a predetermined condition, in the image captured by the image capturing section 200. Then when the matching determining section 240 has determined that there exists an object that matches the condition, the object region specifying section 220 specifies an object region that includes the object that matches the condition. Then when the matching determining section 240 has determined that there exists an object that matches the condition, the output section 270 outputs an image of a subject indicated by the object having a data amount larger than the data amount of the image of the object in the output image, by embedding the same to the output image. Specifically, when the matching determining section 240 has determined that there exists an object that matches the condition, the output section 270 embeds the image of the object region in the image captured by the image capturing section 200 to the small data amount image generated by the small data amount image generating section 210, and outputs the embedded result.

Note that the difference image generating section 265 generates a difference image between the image of the object region in the image captured by the image capturing section 200 and the image of the object region in the small data amount image generated by the small data amount image generating section 210. Then when the matching determining section 240 has determined that there exists an object that matches the condition, the output section 270 embeds the difference image generated by the difference image generating section to the small data amount image generated by the small data amount image generating section 210, and outputs the embedded result.

Specifically, when the matching determining section 240 has determined that there exists an object that matches the condition, the output section 270 embeds the image of the object region, to the small data amount image generated by the small data amount image generating section 210, in the form not visible to the observer, and outputs the embedded result. More specifically, when the matching determining section 240 has determined that there exists an object that matches the condition, the output section 270 embeds the image of the object region to the small data amount image generated by the small data amount image generating section 210, by means of digital watermarking, and outputs the embedded result. For this reason, even when the image outputted from the image capturing apparatus 100 is displayed as it is, the observer is able to observe the image without a feeling of strangeness. On the other hand, if the image of the object region embedded to the small data amount image is extracted by means of image processing and the like, it is possible to display the image of the object region to the surveyor.

Specifically, the small data amount image generating section 210 generates a low image quality image by reducing the image quality of the image captured by the image capturing section 200. Then when the matching determining section 240 has determined that there exists an object that matches the condition, the output section 270 embeds the image of the object region in the image captured by the image capturing section 200 to the low image quality image generated by the small data amount image generating section 210.

More specifically, the small data amount image generating section 210 generates a low resolution image by reducing the resolution of the image captured by the image capturing section 200. For example, the small data amount image generating section 210 may generate a low resolution image by thinning out pixels from the image captured by the image capturing section 200. Then when the matching determining section 240 has determined that there exists an object that matches the condition, the output section 270 embeds the image of the object region in the image captured by the image capturing section 200 to the low resolution image generated by the small data amount image generating section 210, and outputs the embedded result.

In addition, the small data amount image generating section 210 may generate the low gray scale image by reducing the gray scale of the image captured by the image capturing section 200. In this case, when the matching determining section 240 has determined that there exists an object that matches the condition, the output section 270 embeds the image of the object region in the image captured by the image capturing section 200 to the low gray scale image generated by the small data amount image generating section 210, and outputs the embedded result.

Note that when the matching determining section 240 has determined that there exists an object that matches the condition, the object region specifying section 220 may specify a plurality of object regions that include a plurality of objects that match the condition, respectively. Then the embedded image generating section 260 may generate a plurality of images having a different image quality from each other depending on an object feature type, by converting each image of the plurality of object regions in the image captured by the image capturing section 200, to an image of an image quality in accordance with the type of the feature of an object included in each of the plurality of object regions. Then when the matching determining section 240 has determined that there exist a plurality of objects that match the condition, the output section 270 may embed a plurality of images generated by the embedded image generating section 260 to the small data amount image generated by the small data amount image generating section 210 and outputs the embedded result.

Note that the difference image generating section 265 may generate a difference image between each of the plurality of images generated by the embedded image generating section 260 and the image of the object region in the small data amount image generated by the small data amount image generating section 210. In this case, when the matching determining section 240 has determined that there exist a plurality of objects that match the condition, the output section 270 may embed the plurality of difference images generated by the difference image generating section to the small data amount image generated by the small data amount image generating section 210, and output the result.

Note that the image capturing section 200 may capture a motion image. In this case, the small data amount image generating section 210 generates a low display rate motion image by reducing the display rate of the motion image captured by the image capturing section 200. Then the matching determining section 240 determines whether there exists an object that matches a predetermined condition in the motion image captured by the image capturing section 200. When the matching determining section 240 has determined that there exists an object that matches the condition, the object region specifying section 220 specifies the object region that includes the object that matches the condition. Then when the matching determining section 240 has determined that there exists an object that matches the condition, the output section 270 embeds the motion image of the object region in the motion image captured by the image capturing section 200 to the low display rate motion image generated by the small data amount image generating section 210, and outputs the embedded result.

Specifically, by successively capturing the plurality of images, the image capturing section 200 captures a motion image including the plurality of images. Then the small data amount image generating section 210 generates a low display rate motion image by reducing the display rate of the motion image captured by the image capturing section 200, by thinning out a plurality of images included in the motion image captured by the image capturing section 200. Then the matching determining section 240 determines whether an object that matches a predetermined condition exists in the images thinned out by the small data amount image generating section 210. Then when the matching determining section 240 has determined that there exists an object that matches the condition, the object region specifying section 220 specifies an object region that includes the object that matches the condition. Then when the matching determining section 240 has determined that there exists an object that matches the condition, the output section 270 embeds the region image of the object region in the image thinned out by the small data amount image generating section 210 to the image included in the low display rate motion image generated by the small data amount image generating section 210, and outputs the embedded result.

Note that the frequency component calculating section 280 calculates the space frequency component in each of the plurality of regions in the image captured by the image capturing section 200. Then the embedded region specifying section 285 specifies a region having a frequency component lower than a predetermined value in a predetermined frequency region, from among the plurality of regions of the image captured by the image capturing section 200, as an embedded region, based on the space frequency component calculated by the frequency component calculating section 280. Specifically, the embedded region specifying section 285 specifies a region having a frequency component lower than a predetermined value in a region whose frequency is higher than a predetermined frequency, from the plurality of regions of the image captured by the image capturing section 200, as an embedded region, based on the space frequency component calculated by the frequency component calculating section 280. Then when the matching determining section 240 has determined that there exists an object that matches the condition, the output section 270 embeds the image of the object region to the embedded region in the small data amount image generated by the small data amount image generating section 210, by means of digital watermarking, by means of digital watermarking.

Note that the image capturing section 200 may successively capture an image of a data amount larger than the permissible data amount permitted to be outputted to the output destination of the output section 270 per unit time. For example, the image capturing section 200 may successively capture an image of a data amount larger than the permissible data amount permitted to be transmitted by the transmission path 140 per unit time. Alternatively, the image capturing section 200 may successively capture an image of a data amount larger than a data amount that can be processed by the monitors 180-182 per unit time, per unit time. In this case, the small data amount image generating section 210 generates a small data amount image of a data amount smaller than the permissible data amount, by reducing the data amount of the image captured by the image capturing section 200. Then when the matching determining section 240 has determined that there exists an object that matches the condition, the output section 270 embeds the image of the object region to the small data amount image generated by the small data amount image generating section 210 and outputs the embedded result, and when the matching determining section 240 has determined that there does not exist an object that matches the condition, the output section 270 outputs the small data amount image generated by the small data amount image generating section 210.

Note that when the matching determining section 240 has determined that there exists an object that matches the condition, the size calculating section 230 calculates the size of the object. Then when the matching determining section 240 has determined that there exists an object that matches the condition, and when the size calculated by the size calculating section 230 is smaller than a predetermined value, the object region specifying section 220 determines an object region that includes the object that matches the condition. Then when the matching determining section 240 has determined that there exists an object that matches the condition, the output section 270 embeds the image of the object region in the image captured by the image capturing section 200 to the small data amount image generated by the small data amount image generating section 210, on condition that the size calculated by the size calculating section 230 is smaller than the predetermined value. For this reason, according to the monitoring system 110, when an object can he viewed in a size sufficiently large for monitoring in a low resolution image, outputting is performed without embedding the object. Therefore it is possible to prevent a case where the process amount of the image capturing apparatus 100 increases more than necessary.

Note that the image capturing section 200 may successively capture a plurality of images. In this case, the small data amount image generating section 210 generates a plurality of small data amount images by reducing the data amount of each of the plurality of images captured by the image capturing section 200. Then when the matching determining section 240 has determined that there exists an object that matches the condition, the output section 270 embeds the image of the object region in the images thinned out by the small data amount image generating section 210, to the small data amount image generated from the image determined to include an object that matches the condition or to the small data amount image generated from the image captured by the image capturing section 200 after the image has been captured, and outputs the embedded result.

Note that when the matching determining section 240 has determined that there exists an object that matches the condition, the embedded image generating section 260 generates a plurality of embedded images by dividing the image of the object region in the image captured by the image capturing section 200 into a plurality of partial regions. Then when the matching determining section 240 has determined that there exists an object that matches the condition, the output section 270 embeds the plurality of embedded images generated by the embedded image generating section 260 sequentially to the plurality of small data amount images generated by the small data amount image generating section 210, and outputs the embedded result. During this operation, the embedded image generating section 260 may generate a plurality of embedded images by dividing the image of the object region into a plurality of partial regions, so that the image data amount outputted by the output section 270 will be smaller than the permissible data amount permitted to be outputted by the output section 270.

Note that the condition storing section 250 stores, in advance, the extraction condition of the matching object. Then the matching determining section 240 determines whether there exists an object that matches the extraction condition stored in the condition storing section 250, in the image captured by the image capturing section 200. Specifically, the condition storing section 250 stores the lower limit value of the form matching level between the predetermined object and a matching object. Then the matching determining section 240 determines whether an object having the matching level more than or equal to the lower limit value of the form matching level with respect to the predetermined object exists in the image captured by the image capturing section 200.

Alternatively, the condition storing section 250 may store the lower limit value of the color area included in the predetermined color range which a matching object should have. In this case, the matching determining section 240 determines whether there exists an object whose color area included in the predetermined color range is more than or equal to the lower limit value of the color area stored in the condition storing section 250 in the image captured by the image capturing section 200. In addition, the condition storing section 250 may store the lower limit value of the motion amount which a matching object should have. In this case, the matching determining section 240 determines whether there exists an object whose motion amount is more than or equal to the lower limit value of the motion amount in the image captured by the image capturing section 200.

Note that the matching determining section 240 may determine whether the image captured by the image capturing section 200 matches a predetermined condition or not. Then when the matching determining section 240 has judged that the image captured by the image capturing section 200 does not match the condition, the output section 270 may convert the image captured by the image capturing section 200 into an image of a lower image quality than in the case where the matching determining section 240 has determined that the image captured by the image capturing section 200 matches the condition, and output the result.

Note that when the matching determining section 240 has determined that there exists an object that matches the condition, the embedded image obtaining section 290 obtains an image of a subject that has a data mount larger than the data amount of the image of the object matching the condition and that the object matching the condition indicates. Then when the matching determining section 240 has determined that there exists an object that matches the condition, the output section 270 may embed the image obtained by the embedded image obtaining section 290 to the image captured by the image capturing section 200.

For example, when the matching determining section 240 has determined that there exists an object that matches the condition, the embedded image obtaining section 290 obtains an image of a subject that has an image quality higher than the image quality of the image of the object matching the condition and that the object matching the condition indicates.

Specifically, when the matching determining section 240 has determined that there exists an object that matches the condition, the embedded image capturing section 295 captures an image of a subject that has a data mount larger than the data amount of the image of the object matching the condition and that the object matching the condition indicates. For example, when the matching determining section 240 has determined that there exists an object that matches the condition, the embedded image capturing section 295 may capture an image of a subject that has an image quality higher than the image quality of the image of the object matching the condition and that the object matching the condition indicates. Then when the matching determining section 240 has determined that there exists an object that matches the condition, the embedded image obtaining section 290 obtains the image captured by the embedded image capturing section 295.

More specifically, the embedded image capturing section 295 is able to capture an image of the image capturing region with a narrower angle and a higher resolution than that of the image capturing section 200. Then when the matching determining section 240 has determined that there exists an object that matches the condition, the embedded image capturing section 295 captures the image of the subject with a higher resolution than the resolution of the image of the object region captured by the image capturing section 200, by performing image capturing by zooming up the subject by setting the image capturing direction to the direction of the subject indicated by the object. Then the output section 270 embeds the image captured by the embedded image capturing section 295 to the image captured by the image capturing section 200, and outputs the embedded result. Note that the image capturing section 200 may be a fixed camera that does not have such functions as pan, tilt, and zoom up, and the embedded image capturing section 295 may be a PTZ camera having such functions as pan, tilt, and zoom up.

Note that the concrete embedding processing performed by the output section 270 may be performed utilizing the digital watermarking technique as described above. In addition, as described above, the output section 270 may divide the image captured by the embedded image capturing section 295 into a plurality of embedded images, and sequentially embed the plurality of embedded images resulting from the division, to the plurality of images captured by the image capturing section 200. In addition, the embedded image capturing section 295 may capture the motion image of the monitor region with a higher frame rate than the image capturing section 200. Note that the monitoring system 110 in the present embodiment may function as an image capturing system in the innovations herein.

As described above, according to the image capturing apparatus 100, it becomes possible to provide an image of a high image quality, while utilizing the display apparatus 175 or the transmission path that are unable to treat the image of a high image quality captured by the image capturing apparatus 100. Note that the object in the present embodiment includes a region included in the image.

Figure 3:
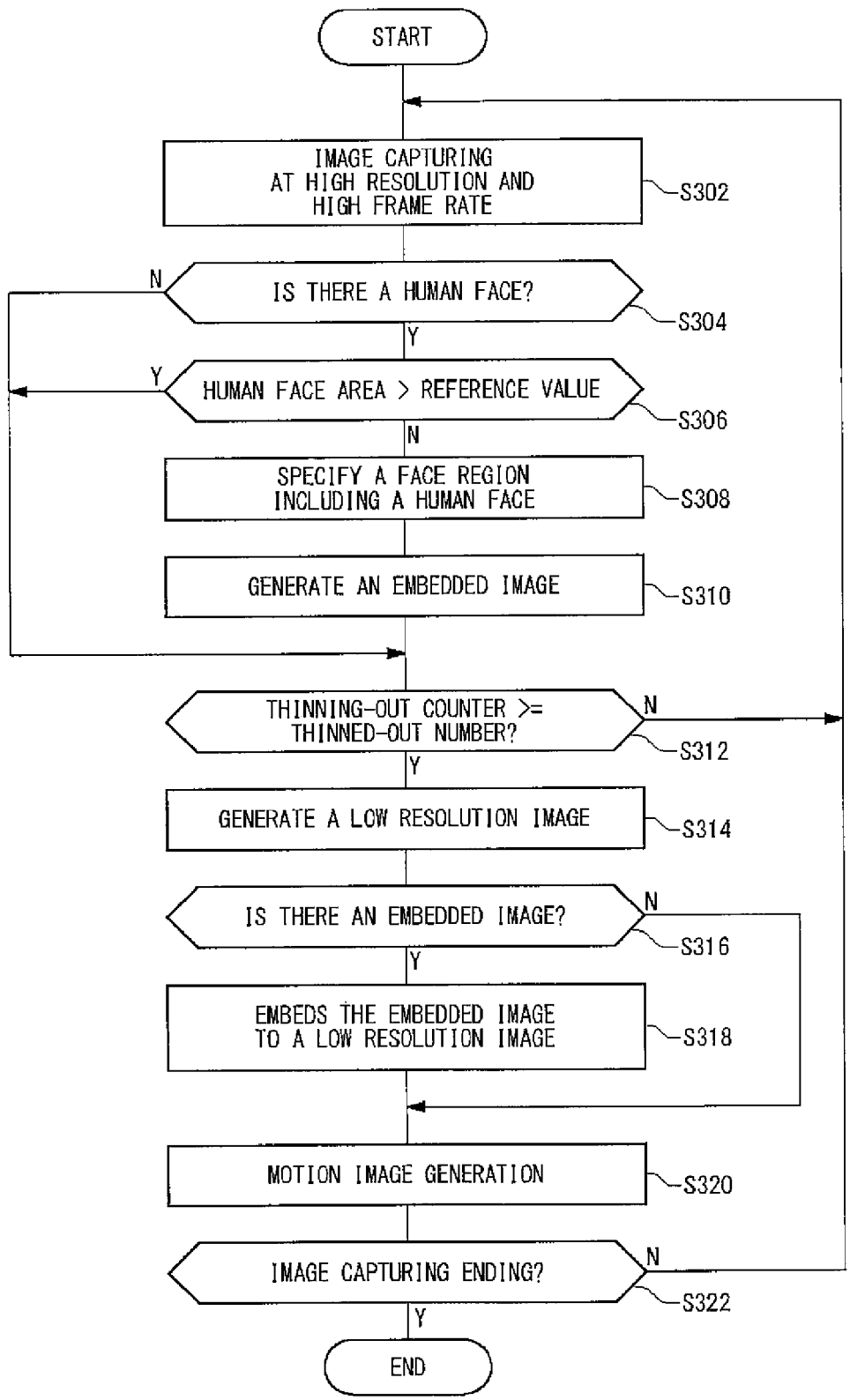
FIG. 3 shows one example of the operational flow of the image capturing apparatus 100.

FIG. 3 shows one example of the operational flow of the image capturing apparatus 100. The image capturing section 200 captures a motion image of the monitor region, by successively capturing the frame image of a resolution higher than the monitor resolution of the monitors 180-182, at a frame rate higher than the monitor display rate of the monitors 180-182 (S302). Note that the small data amount image generating section 210 increments the thinning-out counter whose initial value is 0, each time the image capturing section 200 has performed image capturing.

Then the matching determining section 240 determines whether there exists an object that matches a face of a person, in the frame image captured by the image capturing section 200 (S304). For example, the matching determining section 240 calculates the form matching level between the outline of the object extracted by the edge enhancement or the like and the pattern of the predetermined human face. For example, the matching determining section 240 calculates the value resulting from dividing, by the area of the outline of the object, the area of the portion matching between the outline of the object and the pattern of the human face having the same area as that of the outline of the object as the form matching level. Then the matching determining section 240 determines that there exists an object that matches a human face, if the calculated form matching level is more than or equal to the lower limit value of the form matching level stored in the condition storing section 250.

In S304, when the matching determining section 240 determines that there exists an object that matches a human face, the size calculating section 230 calculates the area of the object. Then the object region specifying section 220 determines whether the area of the object matching a human face is larger than a predetermined reference value or not (S306). When the area calculated by the size calculating section 230 is smaller than the predetermined reference value, the object region specifying section 220 specifies the face region of the predetermined size including the object matching the human face (S308). Note that the face region is one example of the object region in the innovations herein. Then the embedded image generating section 260 cuts away the face region specified in S308 from the image captured by the image capturing section 200, generates an embedded image, and stores the generated embedded image to the embedded image table (S310).

Then the small data amount image generating section 210 determines whether the value of the thinning-out counter has reached a predetermined thinned-out number (S312). When the thinning-out counter has not reached the thinned-out number in S312, the image capturing apparatus 100 passes the processing to S302. When the thinning-out counter has reached the thinned-out number in S312, the small data amount image generating section 210 generates a low resolution image by thinning out pixels from the image captured by the image capturing section 200 (S314). During this operation, the small data amount image generating section 210 generates a low resolution image having a resolution that is less than or equal to the monitor resolution.

Then the output section 270 determines whether there exists an embedded image in the embedded image table (S316). Specifically, when it is determined that there exists an embedded image, the output section 270 embeds the embedded image having been generated and stored by the embedded image generating section 260, to the low resolution image generated by the small data amount image generating section 210 in S314, as a digital watermark (S318). During this operation, the embedded image generating section 260 removes the embedded image from the embedded image table. Then the output section 270 generates a motion image to be outputted from the low resolution image to which an embedded image has been embedded (S320). Note that when it is judged that there does not exist an embedded image in S316, the output section 270 generates a motion image to be outputted from the low resolution image generated in S314 (S320).

Then the image capturing apparatus 100 determines whether an image capturing ending instruction has been received or not (8322). When an image capturing ending instruction has not been received in S322, the image capturing apparatus 100 passes the processing to S302, and when an image capturing ending instruction has been received in S322, the image capturing apparatus 100 ends the processing. Note that when the matching determining section 240 has determined that there does not exist an object matching a human face in S304, or when it is determined that the area of the object is larger than a predetermined value in S306, the image capturing apparatus 100 passes the processing to the determination of S312.

As described above, the image capturing apparatus 100 generates a motion image including a frame image resulting from reducing the image captured by the image capturing section 200 down to the monitor resolution, and outputs the same to the display control apparatus 170. When a face is detected, then the image capturing apparatus 100 embeds the detected face image to the frame image included in the motion image to be outputted, as a digital watermark. Since the resolution of the frame image outputted from the image capturing apparatus 100 is a monitor resolution, the monitors 180-182 are able to display the motion image transmitted from the image capturing apparatus 100 as it is. In addition, since the output section 270 embeds a human face in the form invisible to the surveyor, even if the monitors 180-182 display the motion image transmitted from the image capturing apparatus 100 as it is, the surveyor is able to pursue monitoring without a feeling of strangeness just as in conventional cases.

Note that the display control apparatus 170 may extract the face image from the motion image, and records the extracted face image to the recording apparatus 172. Then the display control apparatus 170 may display information indicating that there exists a face image, by superposing the information thereto. Moreover, according to an instruction of the surveyor, the display control apparatus 170 may read the face image from the recording apparatus 172, and perform enlarged display of the face image to the monitors 180-182. The operation of the display control apparatus 170 is further detailed with reference to the drawings from FIG. 9.

Figure 4:
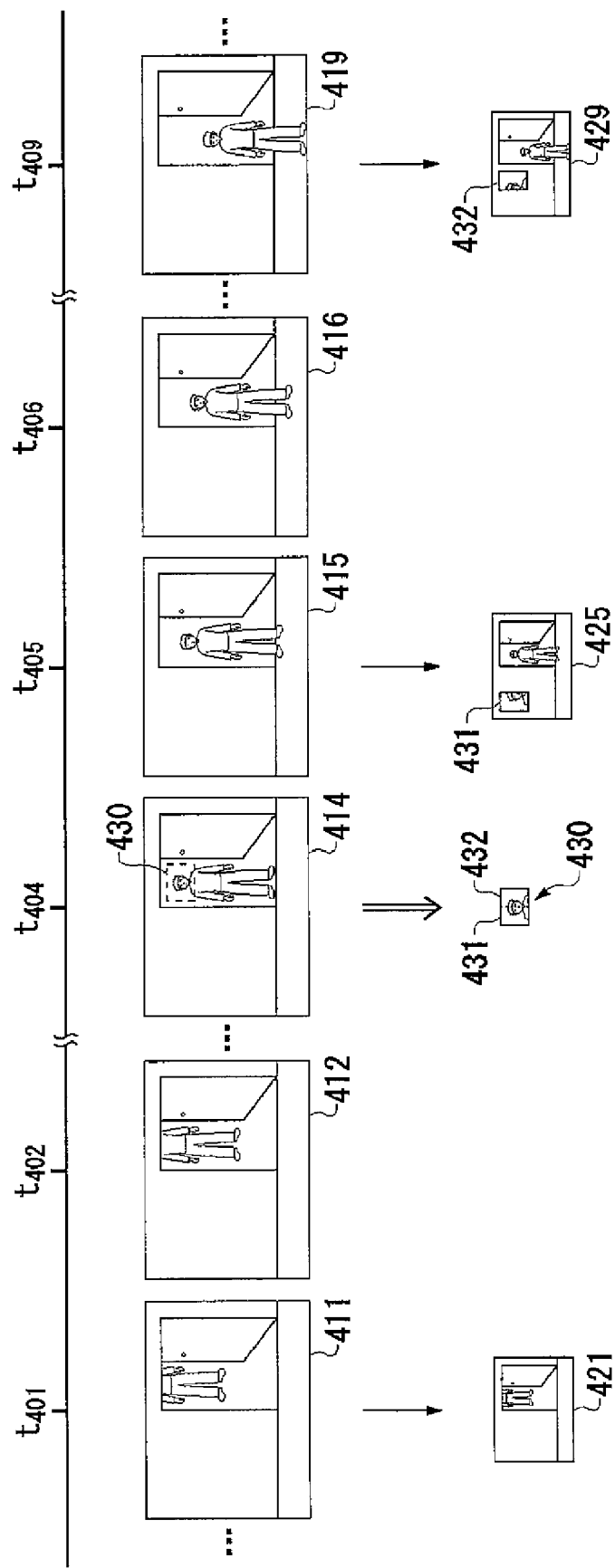
FIG. 4 chronologically shows one example of a frame image of a motion image outputted by an output section 270.

FIG. 4 chronologically shows one example of a frame image included in a motion image outputted by an output section 270. The image capturing section 200 successively captures frame images 411-419 within a predetermined temporal interval. The small data amount image generating section 210 generates a low resolution image from frame images selected for each predetermined number from the frame images 411-419. For example, the small data amount image generating section 210 generates the low resolution images 421, 425, and 429, by either thinning out pixels of the frame images 411, 415, and 419 captured at the times t401, t405, and t409, or by averaging the plurality of pixels of them.

Then when the matching determining section 240 has determined that there exists a human face in the frame image 414, the embedded image generating section 260 generates embedded images 431 and 432 resulting from dividing the face image 430 including a human face into two. The embedded image generating section 260 divides the face image 430 into a size that can be embedded into a low resolution image. Note that an exemplary method of determining the number of division is detailed later. Then the output section 270 embeds the embedded images 431 and 432 into low resolution images 425 and 429 respectively, by means of digital watermarking. Then the output section 270 generates a motion image using the low resolution images 421, 425, and 429. For example, the output section 270 may generate a motion image by encoding the low resolution images 421, 425, and 429 by using MPEG encoding technique.

Note that the difference image generating section 265 generates a difference image between the embedded image 431 and the image of the corresponding region being a region corresponding to the embedded image 431 in the low resolution image 425. Note that the corresponding region may be a region to which the image region of the embedded image 431 corresponds within the low resolution image 425. In addition, the corresponding region may be a region of the low resolution image 425 that includes an object included in the embedded image 431. In the example of the present drawing, the corresponding region may be a human face region in the low resolution image 425. For example, the difference image generating section 265 may generate a difference image between the embedded image 431 and an enlarged image resulting from converting the image of the corresponding region to an image of the same pixel number as that of the embedded image 431. Note that the difference image generating section 265 may generate an enlarged image having the same resolution as that of the embedded image 431, by thinning out the pixel value of the image of the corresponding region.

Then the output section 270 embeds the difference image generated by the difference image generating section 265 to the low image quality image 425 and outputs the embedded result. Note that the above explanation is about the operation of each constituting element where the difference image regarding the embedded image 431 is embedded to the low resolution image 425. However, it is alternatively possible to embed the difference image regarding the embedded image 432 to the low resolution image 429, by performing the similar operation. Since the difference image has a notably reduced low frequency component compared to the embedded image, the data amount thereof is accordingly notably small compared to the embedded image. Therefore, by embedding a difference image to a low resolution image, it is possible to notably reduce the increment of the data amount of the low resolution image compared to a case where an embedded image itself is embedded.

Note that when a difference image is embedded to a low resolution image, the output section 270 may generate information indicating a corresponding region, and output the generated information in association with the low resolution image. Note that the output section 270 may associate either the embedded image or the difference image, to the low resolution image by means of a tag or the like, and output the result.

Figure 5:
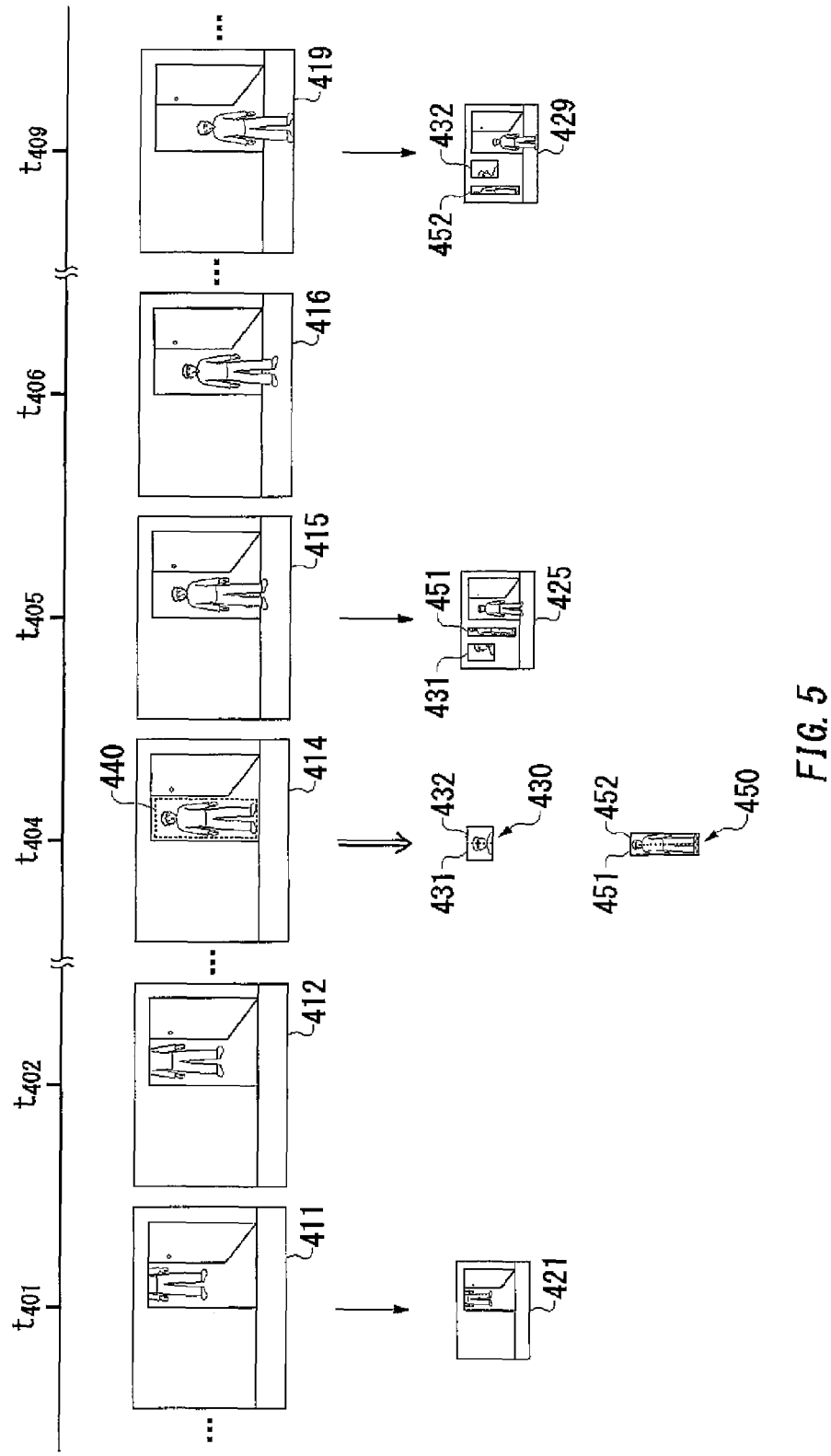
FIG. 5 chronologically shows another example of a frame image of a motion image outputted by the output section 270.

FIG. 5 chronologically shows another example of the frame image included in a motion image outputted by the output section 270. The frame image explained with reference to the present drawing includes embedded therein the body portion of a person in addition to the head portion of the person explained with reference to FIG. 4. In the operation of each constituting element of the image capturing apparatus 100 in generating a frame image illustrated in the present drawing, the operation other than the operation for embedding the body portion of the person is substantially the same as the operation explained with reference to FIG. 4, and so only the differences therefrom are described in the following.

The object region specifying section 220 specifies the body portion region 440 of the person from the frame image 414, as an object matching the condition stored in the condition storing section 250, except for the region of the face of the person. Then the embedded image generating section 260 generates the low resolution image 450 whose resolution is reduced for a predetermined amount by thinning out the pixels of the image of the body portion region 440 of the person. Note that the ratio of the number of thinned out pixels will be predetermined in association with the type of the object. For example, it is possible to predetermine so that the pixel thinning-out operation is not performed respect to the region of the object indicating the head portion of a person, and that pixel thinning-out operation is performed with respect to the region of the object indicating the body portion of a person with a pixel pitch of about ⅔.

The embedded image generating section 260 generates an embedded image 451 and an embedded image 452, by dividing the image of the generated body portion region 440. Then the output section 270 embeds the embedded image 451 and the embedded image 452 to the low resolution image 425 and the low resolution image 429 respectively. Note that it is desirable that the embedded region specifying section 285 select the embedded region to which an image should be embedded, so as not to create overlapping between embedded images in a low resolution image. In addition, it is desirable that the embedded region specifying section 285 select the embedded region to which an image should be embedded, so as not to create overlapping between any object region specified by the object region specifying section 220.

In addition, as explained with reference to FIG. 4, also for the embedded image 451 and the embedded image 452, the difference image generating section 265 may generate a difference image with respect to the image of the corresponding region in the low resolution image. Then the output section 270 may embed the generated difference image to the low resolution image and output the result.

Figure 6:
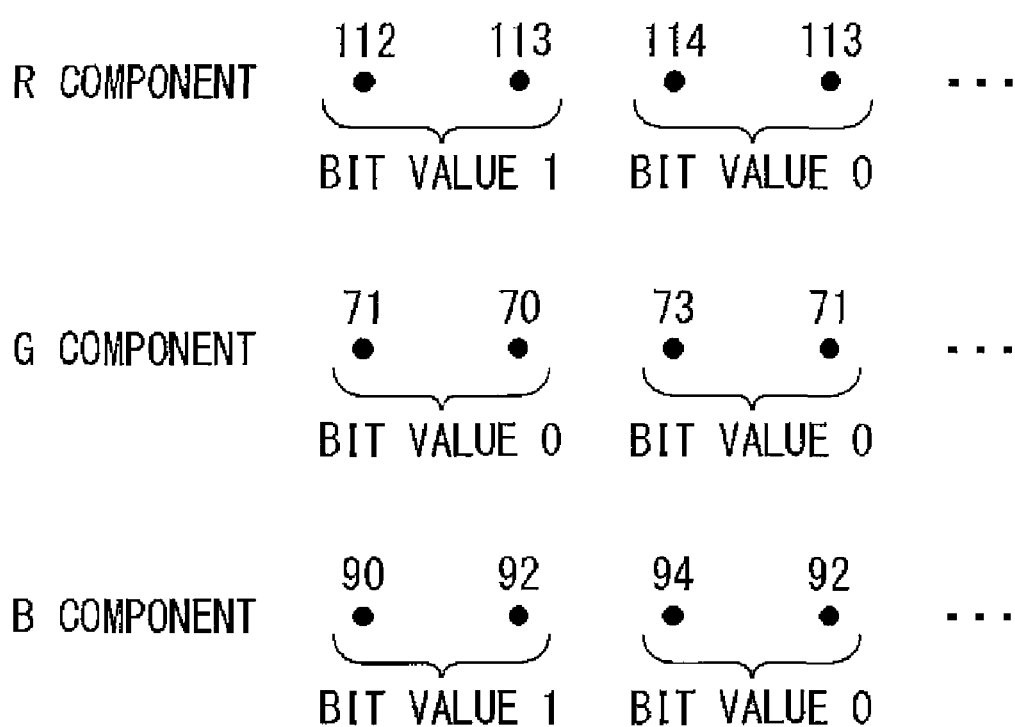
FIG. 6 shows one example of a method for embedding an embedded image, which is performed by the output section 270.

FIG. 6 shows one example of a method for embedding an embedded image, which is performed by the output section 270. The output section 270 embeds the bit value 1 of the embedded image data by setting an brightness value of a second pixel adjacent to a first pixel to be larger than an brightness value of the first pixel, thereby embedding the bit value 0 by setting the brightness value of the second pixel to be smaller than the brightness value of the first pixel. In addition, the output section 270 may embed the bit value 1 included in embedded image data by setting the brightness value of the second pixel to be larger than the intensity value of the first pixel, and embed the bit value 0 by setting the brightness value of the second pixel to be smaller than the brightness value of the first pixel. According to this, the output section 270 is able to embed 1 bit of embedded image for each two pixels, for each of a plurality of color components.

Note that the embedded region specifying section 285 specifies a partial region whose high frequency component is small, as an embedded region, and the output section 270 embeds an embedded image to the embedded region specified by the embedded region specifying section 285. Specifically, the frequency component calculating section 280 calculates the space frequency component for each of a plurality of partial regions in the low resolution images 421, 425, and 429. The embedded region specifying section 285 specifies a partial region whose space frequency component is less than or equal to a predetermined value, as an embedded region, within the space frequency region having more than or equal to a predetermined frequency. In this way, the embedded region specifying section 285 specifies a region having a low space frequency as an embedded region, and therefore it is possible to reduce the deterioration amount of the image quality due to change in brightness value of adjacent pixels, or the like.

Figure 7:
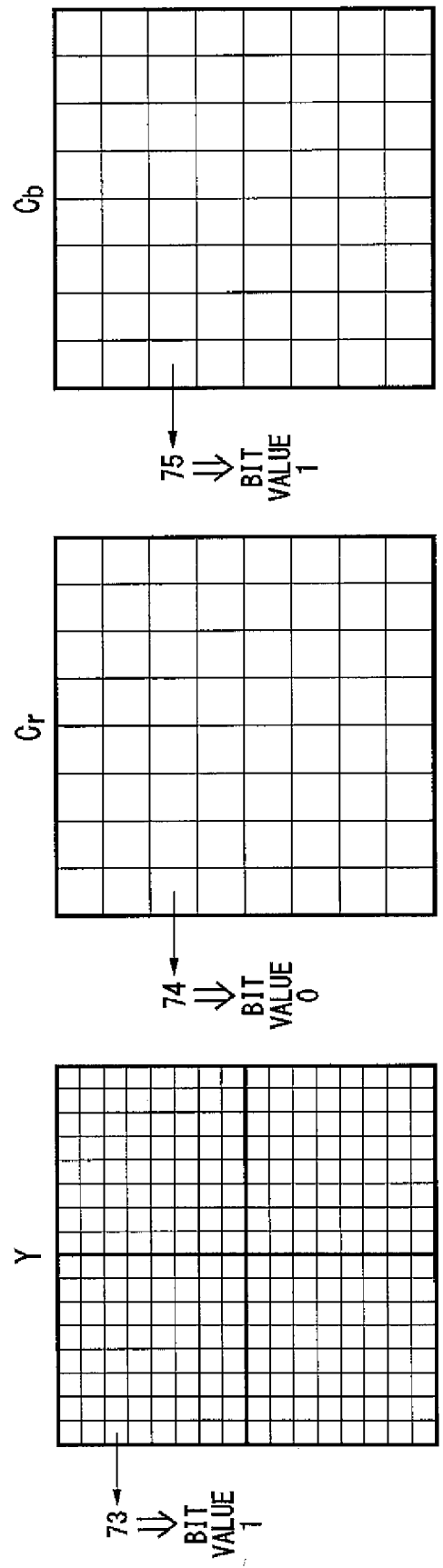
FIG. 7 shows another example of a method for embedding an embedded image, which is performed by the output section 270.

FIG. 7 shows another example of a method for embedding an embedded image, which is performed by the output section 270. When transmitting a plurality of MPEG encoded frame images, the output section 270 embeds a bit value of embedded image data to a DCT coefficient of a block (a brightness block or a color difference block) calculated during an MPEG encoding process. For example, the output section 270 embeds the bit value of the embedded image data to the DCT coefficient obtained by converting, by DCT conversion, the Y, Cr, and Cb components of each block of the low resolution image.

For example, the output section 270 embeds the bit value 0 included in the embedded image data, by converting the DCT coefficient into an even number nearest to the calculated DCT coefficient, and embeds the bit value 1 included in the embedded image data, by converting the DCT coefficient into an odd number nearest to the calculated DCT coefficient. The output section 270 is able to embed embedded image data to all the DCT coefficients in a block, however may embed embedded image data to a DCT coefficient indicating a low frequency component less than or equal to a predetermined frequency. The bit number capable of being embedded in a block is defined depending on the frequency region to which embedding is performed.

In this way, the output section 270 is able to embed the bit value of the embedded image data to the frequency region of the frame image to be outputted. Alternatively, the output section 270 is able to use a variety of embedding methods, such as directly embedding a bit value of embedded image data to a lower bit of the bit sequence representing one pixel brightness value. In addition, the embedded image generating section 260 calculates the pixel number of an image that can be embedded to an embedded region based on the pixel number of the embedded region specified by the embedded region specifying section 285, and defines a division number of the face image 450 based on the bit number that can be embedded by the output section 270 for 1 pixel, and the bit number indicating the face image 450.

FIG. 8 shows one example of a condition stored in the condition storing section 250. The condition storing section 250 stores lower limit values (S1, V1, S$\alpha$, S$\beta$, s$\gamma$, md) respectively for an area of a person, a motion speed of the an object, an area of a change region, an area of a particular color, a form matching level with respect to a reference object, and a matching level in movement direction with the reference direction. Then the matching determining section 240 determines that the object or the frame image match the condition stored in the condition storing section 250, when detecting an object that has an area of a person, a motion speed of the an object, an area of a change region, an area of a particular color, a form matching level with respect to a reference object, or a matching level in movement direction with the reference direction, which is more than or equal to the lower limit value stored in the condition storing section 250. Then the matching determining section 240 determines that the object or the frame image matches the condition stored in the condition storing section 250, when detecting an object that has an area of a person, a motion speed of the an object, an area of a change region, an area of a particular color, a form matching level with respect to a reference object, or a matching level in movement direction with the reference direction, which is more than or equal to the lower limit value stored in the condition storing section 250 in the frame image captured by the image capturing apparatus 100.

Note that the condition storing section 250 may store the lower limit value of the number of pixels having a pixel value that has changed by more than or equal to a predetermined value among a plurality of frame images captured by the image capturing section 200, as the lower limit value of the area of the change region. In addition, the condition storing section 250 may store the lower limit value of the ratio of the pixel number having a pixel value that has changed by more than or equal to a predetermined value with respect to the total pixel number of the frame image, as the lower limit value of the area of the change region. Note that the pixel value may be a brightness value.

In addition, the condition storing section 250 may store the lower limit value of the number of pixels having a color included in a predetermined color range, which is included in a plurality of frame images, as the lower limit value of the area of the particular color. In addition, the condition storing section 250 may store the lower limit value of the ratio of the number of pixels having a color included in a predetermined color range, which is for the total number of pixels of a frame image, as the lower limit value of the area of the particular color.

In addition, the condition storing section 250 may store the lower limit value of the area of an overlapping portion between an outline of an object included in a frame image and a predetermined reference object having the same area, as the lower limit value of the form matching level with respect to the reference object. In addition, the condition storing section 250 may store the lower limit value of the ratio, with respect to the area of the object, of the area of an overlapping portion between the outline of the object included in the frame image and the predetermined reference object having the same area, as the lower limit value of the form matching level with respect to the reference object.

In addition, the condition storing section 250 may store the lower limit value of the index value inversely proportional to the angle formed between the movement direction of the object included in the frame image and the predetermined reference direction, as the lower limit value of the matching level between the reference direction and the movement direction. Note that the reference direction may be a predetermined direction on a frame image, or a predetermined direction in a real space. Note that the condition storing section 250 may store the lower limit value of the index value inversely proportional to the angle formed between the movement direction of the subject indicated by the object included in the frame image or the averaged image and the direction from the position of the subject towards the image capturing section 200, as the lower limit value of the matching level between the reference direction and the movement direction.

In this way, the condition storing section 250 stores an object having a color included in a predetermined particular color region, an object moving among a plurality of frames, an extraction condition used in extracting a region having undergone change within the plurality of frames, or the like, and so the image capturing apparatus 100 is able to extract an object desirable as a monitor target.

Figure 9:
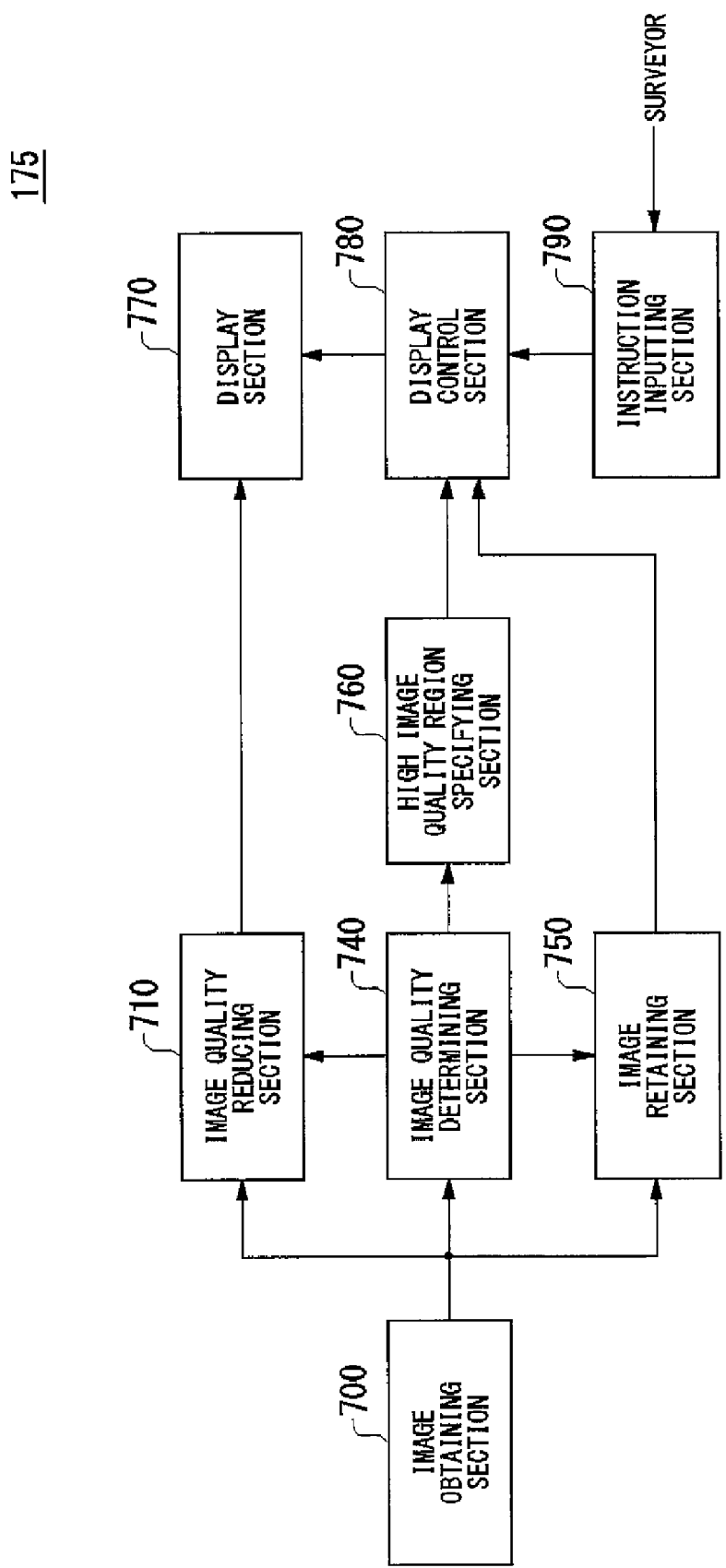
FIG. 9 shows one example of a block configuration of a display apparatus 175.

FIG. 9 shows one example of a block configuration of a display apparatus 175. The display apparatus 175 includes an image obtaining section 700, an image quality reducing section 710, an image quality determining section 740, an image retaining section 750, a high image quality region specifying section 760, a display section 770, a display control section 780, and an instruction inputting section 790. Note that the monitors 180, 181, 182, . . . are an example of the display section 770, and the recording apparatus 172 is one example of the image retaining section 750.

The image obtaining section 700 obtains an image. Specifically, the image retaining section 700 obtains an image outputted by the output section 270. Then the image quality determining section 740 determines whether the image quality of the image obtained by the image obtaining section 700 is higher than a predetermined image quality or not. Then when the image quality determining section 740 has determined that the image quality of the image obtained by the image obtaining section 700 is higher than the predetermined image quality, the image quality reducing section 710 reduces the image obtained by the image obtaining section 700 to an image quality less than or equal to the predetermined image quality. Then when the image quality determining section 740 has determined that the image quality of the image obtained by the image obtaining section 700 is higher than the predetermined image quality, the display section 770 displays the image whose image quality has been reduced by the image quality reducing section 710, and when the image quality determining section 740 has determined that the image quality of the image obtained by the image obtaining section 700 is lower than or equal to the predetermined image quality, the display section 770 displays the image obtained by the image obtaining section 700.

Then when the image quality determining section 740 has determined that the image quality of the image obtained by the image obtaining section 700 is higher than the predetermined image quality, the display control section 780 controls the display section 770 to display information indicating that the image obtaining section 700 has obtained an image of an image quality higher than the predetermined image quality, in the state where the display section 770 is displaying the image whose image quality has been reduced by the image quality reducing section 710. Specifically, when the image quality determining section 740 has determined that the image quality of the image obtained by the image obtaining section 700 is higher than the predetermined image quality, the display control section 780 displays, to the display section 770, characters indicating that the image obtaining section 700 has obtained the image of an image quality higher than the predetermined image quality, by superposing the characters to the image whose image quality has been reduced by the image quality reducing section 710 and is on display by the display section 770. For example, when the image quality determining section 740 has determined that the image quality of the image obtained by the image obtaining section 700 is higher than the predetermined image quality, the display control section 780 may display, to the display section 770, characters including languages indicating the level of image quality, by superposing the characters to the image whose image quality has been reduced by the image quality reducing section 710 and is on display by the display section 770.

Alternatively, when the image quality determining section 740 has determined that the image quality of the image obtained by the image obtaining section 700 is higher than the predetermined image quality, the display control section 780 may control the display section 770 to display a mark indicating that the image obtaining section 700 has obtained an image of an image quality higher than the predetermined image quality, by superposing the mark to the image whose image quality has been reduced by the image quality reducing section 710 and is on display by the display section 770.

Note that the image quality determining section 740 may determine whether the image quality of the image obtained by the image obtaining section 700 is higher than the image quality displayable by the display section 770. In this case, when the image quality determining section 740 has determined that the image quality of the image obtained by the image obtaining section 700 is higher than the image quality displayable by the display section 770, the image quality reducing section 710 reduces the image obtained by the image obtaining section 700 to an image quality less than or equal to the image quality displayable by the display section 770. Then when the image quality determining section 740 has determined that the image quality of the image obtained by the image obtaining section 700 is higher than the image quality displayable by the display section 770, the display section 770 displays an image whose image quality has been reduced by the image quality reducing section 710, and when the image quality determining section 740 has determined that the image quality of the image obtained by the image obtaining section 700 is lower than or equal to the predetermined image quality, the display section 770 displays the image obtained by the image obtaining section 700. Then when the image quality determining section 740 has determined that the image quality of the image obtained by the image obtaining section 700 is higher than the predetermined image quality displayable by the display section 770, the display control section 780 controls the display section 770 to display information indicating that the image obtaining section 700 has obtained an image of an image quality higher than the image quality displayable by the display section 770, in the state where the display section 770 is displaying the image whose image quality has been reduced by the image quality reducing section 710.

Alternatively, the image quality determining section 740 determines whether the resolution of the image obtained by the image obtaining section 700 is higher than the resolution displayable by the display section 770. Then when the image quality determining section 740 has determined that the resolution of the image obtained by the image obtaining section 700 is higher than the resolution displayable by the display section 770, the image quality reducing section 710 reduces the image obtained by the image obtaining section 700 to a resolution lower than or equal to a resolution displayable by the display section 770. Then when the image quality determining section 740 has determined that the resolution of the image obtained by the image obtaining section 700 is higher than the resolution displayable by the display section 770, the display section 770 displays the image whose resolution has been reduced by the image quality reducing section 710, and when the image quality determining section 740 has determined that the resolution of the image obtained by the image obtaining section 700 is less than or equal to the resolution displayable by the display section 770, the display section 770 displays the image obtained by the image obtaining section 700. Then when the image quality determining section 740 has determined that the resolution of the image obtained by the image obtaining section 700 is higher than the resolution displayable by the display section 770, the display control section 780 controls the display section 770 to display information indicating that the image obtaining section 700 has obtained an image of a resolution higher than the resolution displayable by the display section 770, in the state where the display section 770 is displaying the image whose resolution has been reduced by the image quality reducing section 710.

In addition, when the image quality determining section 740 has determined that the resolution of the image obtained by the image obtaining section 700 is higher than the predetermined resolution, the image retaining section 750 retains the image obtained by the image obtaining section 700. Then the instruction inputting section 790 receives, from a user, an instruction to display the image retained by the image retaining section 750. Then when the instruction inputting section 790 has received, from a user, an instruction to display the image retained by the image retaining section 750, the display control section 780 performs enlarged display of the image of a partial region being at least part of the image retained by the image retaining section 750 to the display section 770 at the resolution displayable by the display section 770.

In addition, when the image quality determining section 740 has determined that the resolution of the image obtained by the image obtaining section 700 is higher than the resolution displayable by the display section 770, the high image quality region specifying section 760 specifies a high image quality region whose resolution is higher than the resolution displayable by the display section 770, within the image obtained by the image obtaining section 700. Then when the image quality determining section 740 has determined that the resolution of the image obtained by the image obtaining section 700 is higher than the resolution displayable by the display section 770, the display control section 780 controls the display section 770 to display a box surrounding the high image quality region specified by the high image quality region specifying section 760, in the state where the display section 770 is displaying the image whose resolution has been reduced by the image quality reducing section 710.

The image obtaining section 700 obtains a motion image. Specifically, the image quality determining section 740 determines whether the image quality of the motion image obtained by the image obtaining section 700 is higher than a predetermined image quality. Then when the image quality determining section 740 has determined that the image quality of the motion image obtained by the image obtaining section 700 is higher than the predetermined image quality, the image quality reducing section 710 reduces the motion image obtained by the image obtaining section 700 to an image quality that is less than or equal to the predetermined image quality. Then when the image quality determining section 740 has determined that the image quality of the motion image obtained by the image obtaining section 700 is higher than the predetermined image quality, the display section 770 displays the motion image whose image quality is reduced by the image quality reducing section 710, and when the image quality determining section 740 has determined that the image quality of the motion image obtained by the image obtaining section 700 is less than or equal to the predetermined image quality, the display section 770 displays the motion image obtained by the image obtaining section 700. Then when the image quality determining section 740 has determined that the image quality of the motion image obtained by the image obtaining section 700 is higher than the predetermined image quality, the display control section 780 controls the display section 770 to display information indicating that the image obtaining section 700 has obtained a motion image whose image quality is higher than the predetermined image quality, in the state where the display section 770 is displaying the motion image whose image quality has been reduced by the image quality reducing section 710.

Specifically, the image quality determining section 740 determines whether the display rate of the motion image obtained by the image obtaining section 700 is higher than the display rate displayable by the display section 770. Then when the image quality determining section 740 has determined that the display rate of the motion image obtained by the image obtaining section 700 is higher than the display rate displayable by the display section 770, the image quality reducing section 710 reduces the display rate of the motion image obtained by the image obtaining section 700 to less than or equal to display rate displayable by the display section 770. Then when the image quality determining section 740 has determined that the display rate of the motion image obtained by the image obtaining section 700 is higher than the display rate displayable by the display section 770, the display section 770 displays a motion image whose display rate has been reduced by the image quality reducing section 710, and when the image quality determining section 740 has determined that the display rate of the motion image obtained by the image obtaining section 700 is less than or equal to the display rate displayable by the display section 770, the display section 770 displays the motion image obtained by the image obtaining section 700. Then when the image quality determining section 740 has determined that the display rate of the motion image obtained by the image obtaining section 700 is higher than the display rate displayable by the display section 770, the display control section 780 controls the display section 770 to display information indicating that the image obtaining section 700 has obtained an image of a display rate higher than the display rate displayable by the display section 770, in the state where the display section 770 is displaying the motion image whose display rate has been reduced by the image quality reducing section 710.

Note that when the image quality determining section 740 has determined that the display rate of the motion image obtained by the image obtaining section 700 is higher than the display rate displayable by the display section 770, the image retaining section 750 retains the motion image obtained by the image obtaining section 700. Then the instruction inputting section 790 receives, from a user, an instruction to display the motion image retained by the image retaining section 750. Then when the instruction inputting section 790 receives, from a user, an instruction to display the motion image retained by the image retaining section 750, the display control section 780 displays, to the display section 770, the plurality of images included in the motion image retained by the image retaining section 750, at the display rate displayable by the display section 770.

Figure 10:
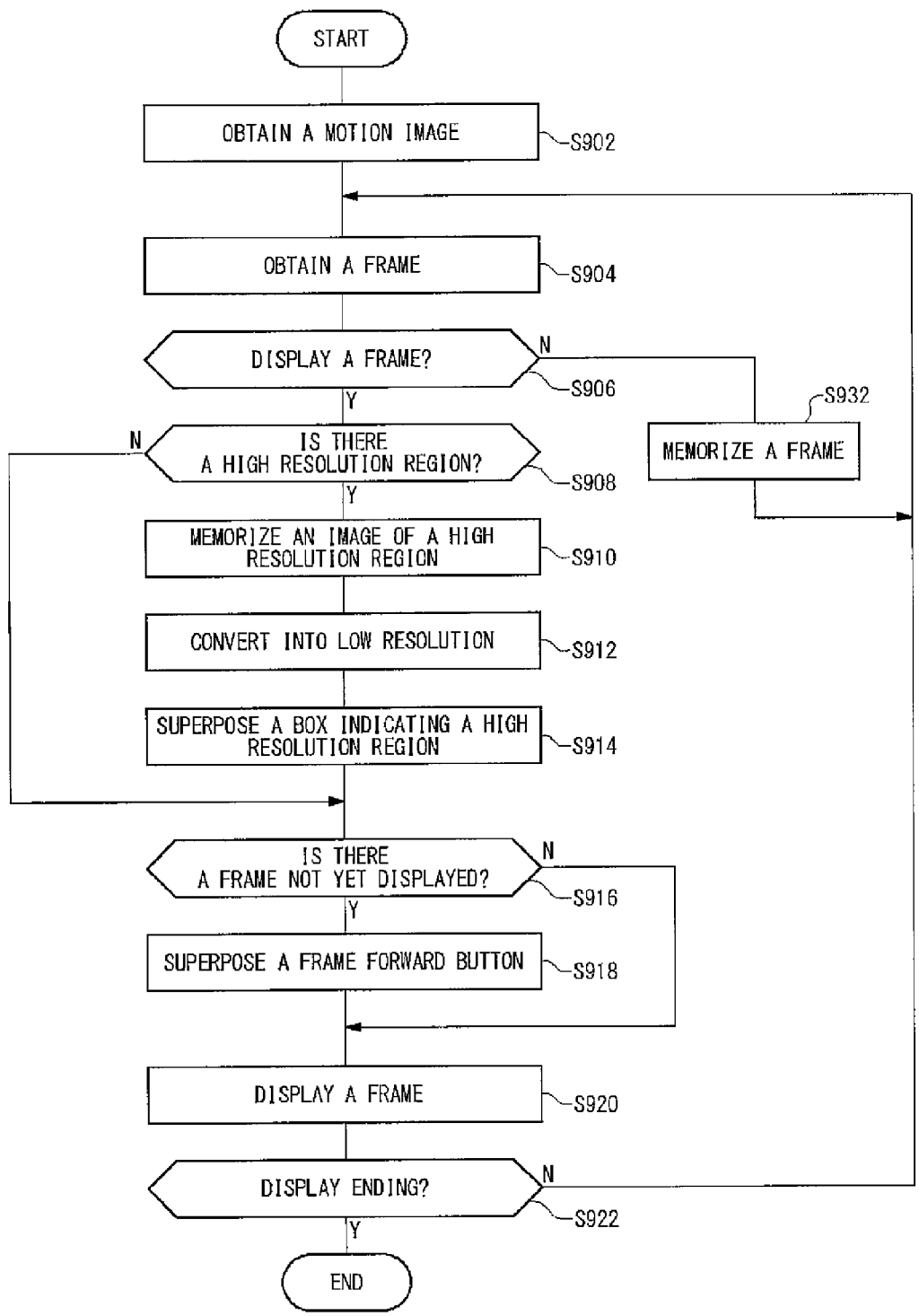
FIG. 10 shows one example of the operational flow of the display apparatus 175.

FIG. 10 shows one example of the operational flow of the display apparatus 175. The image obtaining section 700 obtains a motion image from the image capturing apparatus 100 (S902). Then the image obtaining section 700 extracts a series of frame images from the motion image obtained in S902 (S904). For example, when obtaining an MPEG encoded motion image from the output section 270, the image obtaining section 700 extracts the plurality of pictures starting from an I picture to the picture immediately prior to the next I picture, as a series of frame images. Alternatively, the image obtaining section 700 may obtain a predetermined number of frame images constituting a predetermined period of motion image, or may obtain a plurality of frame images constituting one scene of motion image determined based on the change in the image content of the motion image, as a series of frame images.

Then the image quality determining section 740 determines whether to display a frame image or not (S906). For example, the image quality determining section 740 determines to display a frame image, in displaying the motion image obtained from the image capturing apparatus 100 to the display section 770 by performing thereto a thinning-out operation as appropriate, when the number of frames thinned out after the display section 770 displayed the frame images last time reaches the number of frame images to be thinned out for enabling display of the frame images at the display rate displayable by the display section 770. When it is determined not to display a frame image in S906, the image retaining section 750 memorizes the frame image (S932), and passes the processing to S904.

Then the image quality determining section 740 determines whether there exists a region of a higher resolution than the resolution displayable by the display section 770 in the frame images (S908). Note that when the output section 270 is partially outputting an image of a high resolution, the output section 270 outputs a motion image together with information indicating a resolution for each region, and in this case, the image quality determining section 740 may determine whether there exists a region of a higher resolution than the resolution displayable by the display section 770 in the frame images, by referring to the information indicating the resolution. When it is determined that a region of a high resolution exists in the frame images in S908, the image retaining section 750 memorizes a image of the region of the high resolution (S910). Then the image quality reducing section 710 converts the frame images to the resolution displayable by the display section 770 (S912). Then the display control section 780 superposes a box indicating the region of the high resolution specified by the high image quality region specifying section 760, to the frame image of a low resolution undergone the conversion of the image quality reducing section 710 (S914).

Then the display control section 780 determines whether there exists a frame image not yet displayed (S916). Specifically, if it is determined not to display a frame image in S906 for a predetermined time width up to the present, the display control section 780 determines that there exists a frame image not yet displayed. When it is determined that there exists a frame image not yet displayed in S916, the display control section 780 superposes a frame forward button to a frame image of a low resolution having undergone the conversion of the image quality reducing section 710 (S918). Then the display section 770 displays the frame image (S920).

Then it is determined whether all the motion image obtained in S902 has undergone the processing (S922), when all the motion image has undergone the processing, the processing is ended, and not all the motion image has undergone the processing, the processing is returned to S904. Note that when it is judged that there does not exist any frame image not yet displayed in S916, the processing is passed to S920. In addition, it is judged that there does not exist a region of a high resolution in the frame images in S908, the processing is passed to S916.

Note that although the operation of the display apparatus 175 is explained using a sequential processing flow for avoiding complication of explanation in the above, it is needless to say that part of the processing described above may be performed in parallel with the other part of the processing. For example, processing to obtain a motion image in S902 and processing to extract a series of frame images in S904 may be performed in parallel with the other processing. As described above, the display apparatus 175 may report to a surveyor that a motion image of a high display rate or a high resolution has been obtained by means of a box or a frame forward button or the like, while displaying the motion image of a high display rate and a high resolution captured by the image capturing apparatus 100 by converting the same into a form displayable by the display section 770.

Figure 11:
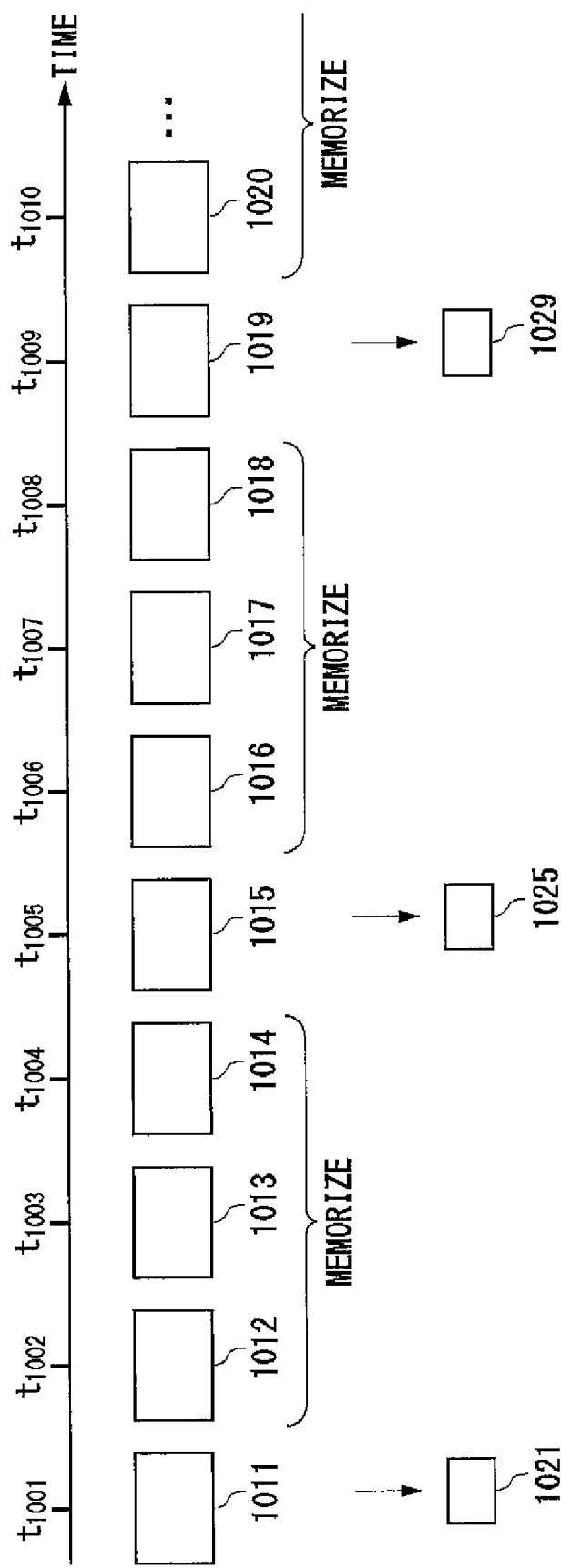
FIG. 11 shows one example of timing at which a display section 770 displays an image.

FIG. 11 shows one example of timing at which a display section 770 displays an image. The image obtaining section 700 obtains a motion image including the frame images 1001-1020, from the image capturing apparatus 100. Then the image quality reducing section 710 thins out the frame images 1012, 1013, 1014, 1016, 1017, 1018, 1020 included in the motion image, so that the display rate of the frame image displayed by the display section 770 will be less than or equal to the display rate displayable by the display section 770. The image retaining section 750 memorizes the thinned out frame images 1012, 1013, 1014, 1016, 1017, 1018, 1020.

In addition, the image quality reducing section 710 reduces the resolution of the frame images 1011, 1015, 1019 down to the resolution displayable by the display section 770, when the resolution of the frame images is more than or equal to the resolution displayable by the display section 770, thereby generating the display frame images 1021, 1025, and 1029. Then the display section 770 displays the motion image whose resolution and display rate are reduced, by sequentially displaying the display frame images 1021, 1025, and 1029. Note that the resolution of the frame images is more than or equal to the resolution displayable by the display section 770, and so the image retaining section 750 also memorizes the frame images 1011, 1015, and 1019.

Then when there exists any thinned out frame image, the display control section 780 superposes a frame forward mark to the display frame images 1025 and 1029, and causes the display section 770 to display the result. Then the display control section 780 superposes a mark indicating that the high resolution is displayable, to the display frame images 1021, 1025, and 1029, when the resolution of the frame images is more than or equal to the resolution displayable by the display section 770, and causes the display section 770 to display the result.

Note that when there partially exists a region of a high resolution, the high image quality region specifying section 760 specifies the region of a high resolution. In addition, when the object is embedded in the frame images by means of digital watermarking or the like by the image capturing apparatus 100, the high image quality region specifying section 760 specifies a region including the object. Then the display control section 780 superposes a box surrounding the region of a high resolution or the region including the object, to the frame images 1021, 1025, and 1029 to be displayed, and causes the display section 770 to display the result.

As explained so far, the display apparatus 175 enables a surveyor to recognize that an image of a high display rate or resolution which is beyond the display capability of the display section 770 has been obtained, by performing display of a mark or a box superposed onto a frame image.

Figure 12:
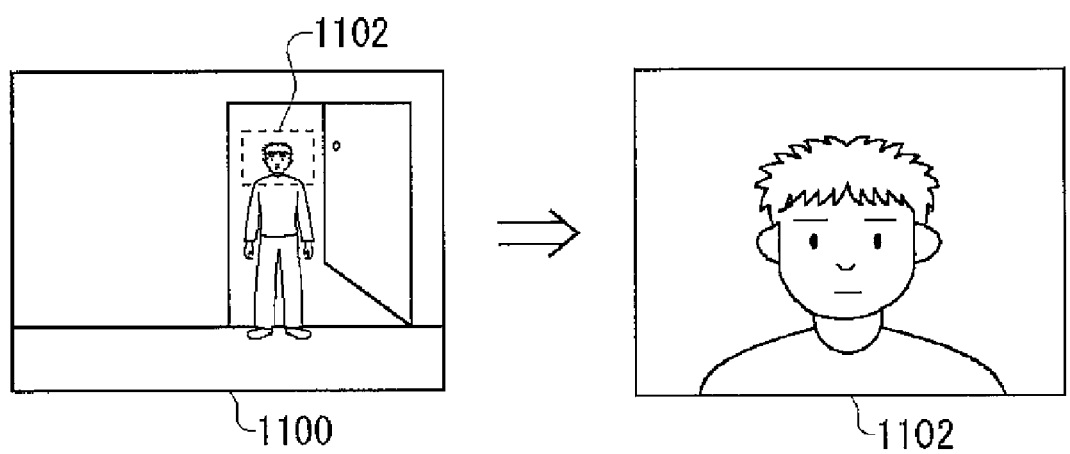
FIG. 12 shows one example of an image displayed by the display section 770.

FIG. 12 shows one example of an image displayed by the display section 770. The display control section 780 controls the display section 770 to display a box 1102 surrounding an object displayable in high image quality by superposing the same to a low image quality image (screen 1100). The image in this box 1102 is retained by the image retaining section 750. When the region within the box 1102 is touched by a finger of a surveyor or the like, or when the region within the box 1102 is pointed by an input apparatus such as a mouse, the instruction inputting section 790 receives an instruction so as to perform enlarged display of the image within the box 1102.

When an instruction to perform enlarged display of the image within the box 1102 is received by the instruction inputting section 790, the image of the object surrounded by the selected box 1102 is obtained from the image retaining section 750 and the display section 770 is caused to display the same. Since the image of the object retained in the image retaining section 750 is of a resolution higher than the resolution displayable by the display section 770, the display section 770 will perform enlarged display of the object. In this way, a surveyor is able to confirm, on the existing monitors 180-182, the image of a high resolution that includes an object such as an important person as a monitor target.

Figure 13:
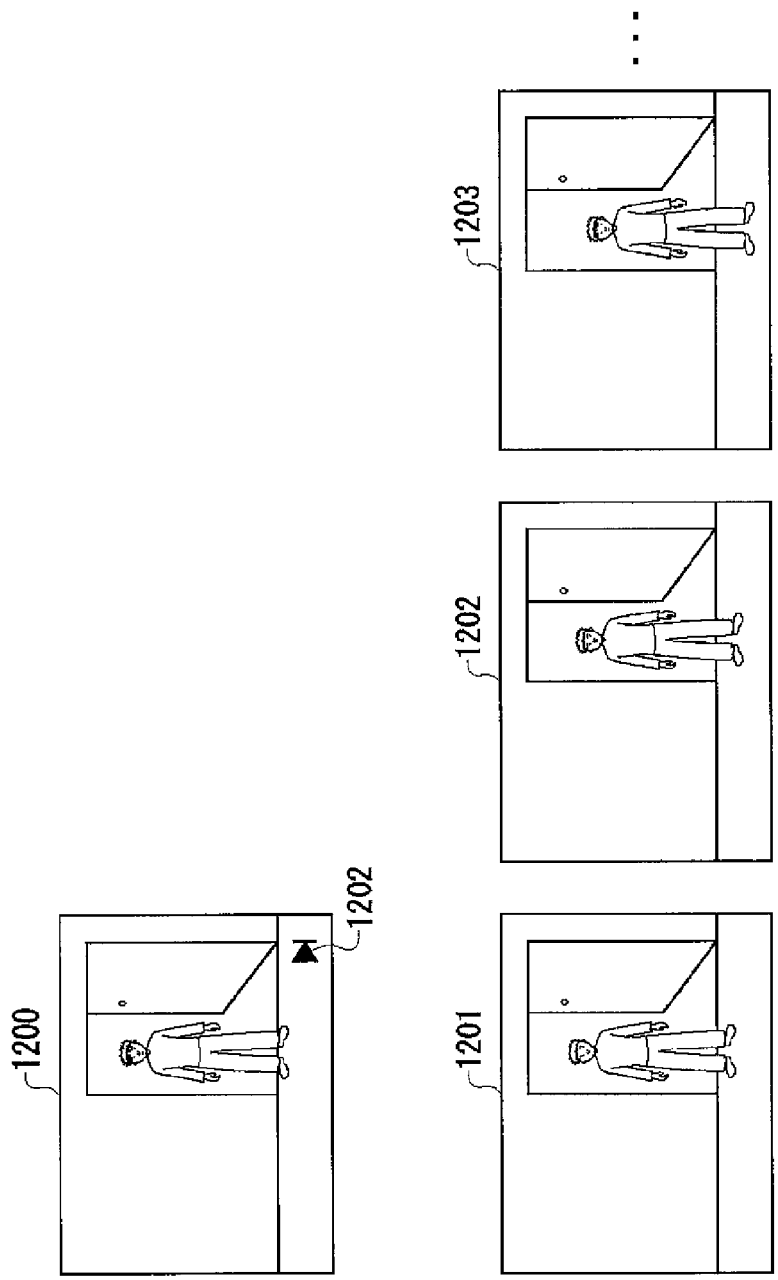
FIG. 13 shows another example of an image displayed by the display section 770.

FIG. 13 shows another example of an image displayed by the display section 770. When the frame image display is performed after performing a thinning out operation, the display control section 780 superposes a mark 1202 indicating that the thinned out frame image is reproduceable by frame forward processing, to the frame image to be displayed (screen 1200). When the position at which the mark 1202 is displayed is touched by a finger of a surveyor or the like, or is pointed by an input apparatus such as a mouse, the instruction inputting section 790 receives an instruction to perform a frame forward display.

When the instruction inputting section 790 receives an instruction to perform a frame forward display, the thinned out frame images are obtained from the image retaining section 750, and each time the instruction inputting section 790 receives an instruction to perform a frame forward display, the display section 770 is caused to perform sequential display of them. Note that the frame images retained in the image retaining section 750 may be reproduced at the display rate displayable by the display section 770. In this case, the display section 770 will perform the display in a slower speed than in actual cases. According to the above-described operations, a surveyor is able to confirm fine human actions.

Figure 14:
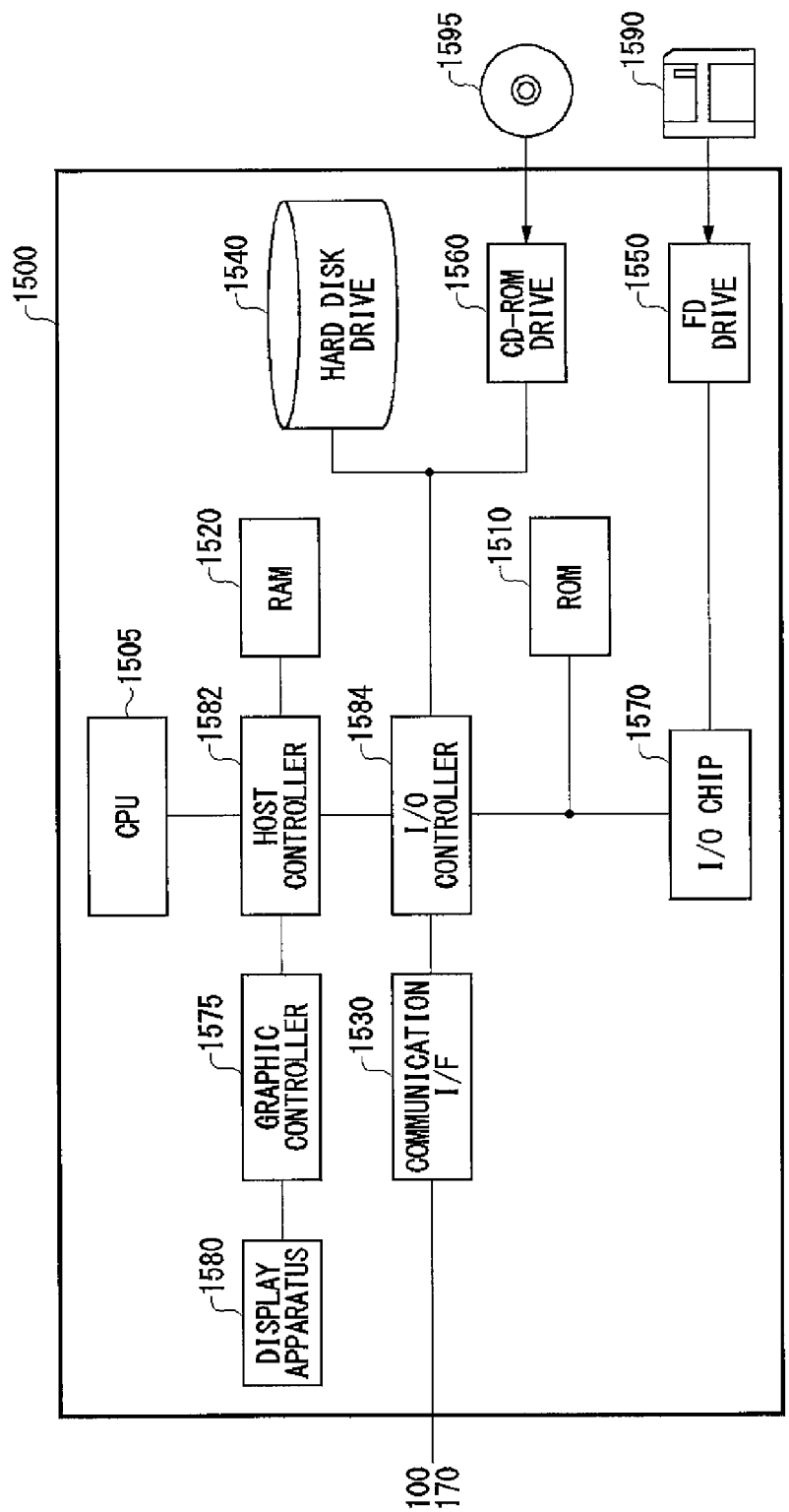
FIG. 14 shows one example of a hardware configuration of a computer 1500 according to the image capturing apparatus 100 and the display apparatus 175.

FIG. 14 shows one example of a hardware configuration of a computer 1500 according to the image capturing apparatus 100 and the display apparatus 175. The computer 1500 is provided with a CPU peripheral section that includes a CPU 1505, a RAM 1520, a graphic controller 1575, and a display apparatus 1580 connected to each other by a host controller 1582; an input/output section that includes a communication interface 1530, a hard disk drive 1540, and a CD-ROM drive 1560, all of which are connected to the host controller 1582 by an input/output controller 1584; and a legacy input/output section that includes a ROM 1510, a flexible disk drive 1550, and a input/output chip 1570, all of which are connected to the input/output controller 1584.

The host controller 1582 is connected to the RAM 1520 and is also connected to the CPU 1505 and the graphic controller 1575 accessing the RAM 1520 at a high transfer rate. The CPU 1505 operates to control each section based on programs stored in the ROM 1510 and the RAM 1520. The graphic controller 1575 obtains image data generated by the CPU 1505 or the like on a frame buffer disposed inside the RAM 1520 and displays the image data in the display apparatus 1580. Alternatively, the graphic controller 1575 may internally include the frame buffer storing the image data generated by the CPU 1505 or the like.

The input/output controller 1584 connects the hard disk drive 1540 serving as a relatively high speed input/output apparatus, the communication interface 1530, and the CD-ROM drive 1560 to the host controller 1582. The hard disk drive 1540 stores the programs and data used by the CPU 1505 housed in the computer 1500. The communication interface 1530 communicates with the information capturing apparatus 100 and the display apparatus 175 via a network, and provides the image capturing apparatus 100 and the display apparatus 175 with the programs and data. The CD-ROM drive 1560 reads the programs and data from a CD-ROM 1595 and provides the read information to the communication interface 1530 and to the hard disk drive 1540 via the RAM 1520.

Furthermore, the input/output controller 1584 is connected to the ROM 1510, and is also connected to the flexible disk drive 1550 and the input/output chip 1570 serving as a relatively low speed input/output apparatus. The ROM 1510 stores a boot program performed when the computer 1500 starts up, a program relying on the hardware of the computer 1500, and the like. The flexible disk drive 1550 reads programs or data from a flexible disk 1590 and supplies the read programs or data to the communication interface 1530 and the hard disk drive 1540 via the RAM 1520. The input/output chip 1570 is connected to a variety of input/output apparatuses via the flexible disk drive 1550, and a parallel port, a serial port, a keyboard port, a mouse port, or the like, for example.

A program supplied to the communication interface 1530 via the RAM 1520 is provided by a user in a state where it is stored in a storage medium, such as the flexible disk 1590, the CD-ROM 1595, or an IC card. The program is read from the storage medium, supplied to the communication interface 1530 via the RAM 1520, and transmitted to the image capturing apparatus 100 and to the display apparatus 175 via a network. The program transmitted to the image capturing apparatus 100 and to the display apparatus 175 is installed and executed in the image capturing apparatus 100 and in the display apparatus 175.

The program installed for execution by the image capturing apparatus 100 causes the image capturing apparatus 100 to function as the image capturing section 200, the small data amount image generating section 210, the object region specifying section 220, the size calculating section 230, the matching determining section 240, the condition storing section 250, the embedded image obtaining section 290, the embedded image capturing section 295, the output section 270, the frequency component calculating section 280, and the embedded region specifying section 285, as explained with reference to FIG. 1 through FIG. 13. In addition, the program causes the embedded image obtaining section 290 to function as the embedded image generating section 260 as explained with reference to FIG. 1 through FIG. 13. The program installed for execution by the display apparatus 175 causes the display apparatus 175 to function as the image obtaining section 700, the image quality reducing section 710, the image quality determining section 740, the image retaining section 750, the high image quality region specifying section 760, the display section 770, the display control section 780, and the instruction inputting section 790, as explained with reference to FIG. 1 through FIG. 13.

The programs shown above may be stored in an external storage medium. In addition to the flexible disk 1590 and the CD-ROM 1595, an optical recording medium such as a DVD or PD, a magnetooptical medium such as an MD, a tape medium, a semiconductor memory such as an IC card, or the like can be used as the recording medium. Furthermore, a storage apparatus such as a hard disk or a RAM disposed in a server system connected to a dedicated communication network or the Internet may be used as the storage medium and the programs may be provided to the computer 1500 via the network.

Although some aspects of the present invention have been described by way of exemplary embodiments, it should be understood that those skilled in the art might make many changes and substitutions without departing from the spirit and the scope of the present invention which is defined only by the appended claims.

What is claimed is:

1. An image capturing apparatus comprising:
an image capturing section that captures an image;
an output image generating section that generates a small data amount image by reducing a data amount from the image captured by the image capturing section;
a matching determining section that determines whether an object that matches a predetermined condition exists in the image captured by the image capturing section;
an output section that outputs, via a transmission path to a display control apparatus provided outside of the image capturing apparatus, by embedding in the small data amount image, an image of a subject indicated by the object having a data amount larger than a data amount of an image of the object in the small data amount image, when the matching determining section has determined that an object that matches the condition exists;
an object region specifying section that, when the matching determining section has determined that an object that matches the condition exists, specifies an object region including the object that matches the condition, in the image captured by the image capturing section;
a frequency component calculating section that calculates a space frequency component of each of a plurality of regions in the image captured by the image capturing section; and
an embedded region specifying section that specifies, as an embedded region, a region having a frequency component lower than a predetermined value in a predetermined frequency region from among the plurality of regions in the image captured by the image capturing section, based on the space frequency component calculated by the frequency component calculating section, wherein
the output image generating section includes:
a small data amount image generating section that generates the small data amount image by reducing the data amount of the image captured by the image capturing section, and
the output section, when the matching determining section has determined that an object that matches the condition exists, embeds the image of the object region in the image captured by the image capturing section to the small data amount image, and outputs the embedded result,
wherein the output section, when the matching determining section has determined that an object that matches the condition exists, embeds the image of the object region to the small data amount image generated by the small data amount image generating section, by means of digital watermarking, and outputs the embedded result, and wherein
the output section, when the matching determining section has determined that an object that matches the condition exists, embeds the image of the object region to the embedded region of the small data amount image generated by the small data amount image generating section, by means of digital watermarking, and outputs the embedded result.

2. The image capturing apparatus as set forth in claim 1, wherein
the small data amount image generating section generates a low image quality image by reducing an image quality of the image captured by the image capturing section, and
the output section, when the matching determining section has determined that an object that matches the condition exists, embeds the image of the object region in the image captured by the image capturing section to the low image quality image generated by the small data amount image generating section, and outputs the embedded result.

3. The image capturing apparatus as set forth in claim 2, wherein
the small data amount image generating section generates a low gray scale image by reducing a gray scale of the image captured by the image capturing section, and
the output section, when the matching determining section has determined that an object that matches the condition exists, embeds the image of the object region in the image captured by the image capturing section to the low gray scale image generated by the small data amount image generating section, and outputs the embedded result.

4. The image capturing apparatus as set forth in claim 2, wherein
the small data amount image generating section generates a low resolution image by reducing a resolution of the image captured by the image capturing section, and
the output section, when the matching determining section has determined that an object that matches the condition exists, embeds the image of the object region in the image captured by the image capturing section to the low resolution image generated by the small data amount image generating section, and outputs the embedded result.

5. The image capturing apparatus as set forth in claim 4, wherein
the small data amount image generating section generates the low resolution image by thinning out pixels from the image captured by the image capturing section.

6. The image capturing apparatus as set forth in claim 1, wherein
the image capturing section captures a motion image,
the small data amount image generating section generates a low display rate motion image by reducing a display rate of the motion image captured by the image capturing section,
the matching determining section determines whether an object that matches a predetermined condition exists in the motion image captured by the image capturing section,
the object region specifying section, when the matching determining section has determined that an object that matches the condition exists, specifies an object region including the object that matches the condition, and
the output section, when the matching determining section has determined that an object that matches the condition exists, embeds a motion image of the object region in the motion image captured by the image capturing section to the low display rate motion image generated by the small data amount image generating section, and outputs the embedded result.

7. The image capturing apparatus as set forth in claim 6, wherein
the image capturing section captures a motion image containing a plurality of images, by successively capturing the plurality of images,
the small data amount image generating section generates a low display rate motion image by reducing a display rate of the motion image captured by the image capturing section, by thinning out a plurality of images included in the motion image captured by the image capturing section,
the matching determining section determines whether an object that matches a predetermined condition exists in the images thinned out by the small data amount image generating section,
the object region specifying section, when the matching determining section has determined that an object that matches the condition exists, specifies an object region including the object that matches the condition, and
the output section, when the matching determining section has determined that an object that matches the condition exists, embeds a region image of the object region included in the images thinned out by the small data amount image generating section, to the image included in the low display rate motion image generated by the small data amount image generating section, and outputs the embedded result.

8. The image capturing apparatus as set forth in claim 1, wherein
the image capturing section successively captures an image of a data amount larger than a permissible data amount permitted to be outputted to an output destination of the output section per unit time,
the small data amount image generating section generates a small data amount image of a data amount smaller than the permissible data amount, by reducing a data amount of the image captured by the image capturing section, and
the output section, when the matching determining section has determined that an object that matches the condition exists, embeds the image of the object region to the small data amount image generated by the small data amount image generating section, and outputs the embedded result, and when the matching determining section has determined that an object that matches the condition does not exist, outputs the small data amount image generated by the small data amount image generating section.

9. The image capturing apparatus as set forth in claim 1, further comprising:
a condition storing section that stores, in advance, a condition which an object should match, wherein
the matching determining section determines whether an object that matches the condition stored in the condition storing section exists in the image captured by the image capturing section.

10. The image capturing apparatus as set forth in claim 9, wherein
the condition storing section stores a lower limit value of a form matching level between a predetermined object and a matching object, and
the matching determining section determines whether an object that has a matching level that is more than or equal to the lower limit value of the form matching level with respect to the predetermined object exists in the image captured by the image capturing section.

11. The image capturing apparatus as set forth in claim 9, wherein
the condition storing section stores a lower limit value of a color area included in a predetermined color range which a matching object should have, and
the matching determining section determines whether an object whose color area included in the predetermined color range is more than or equal to the lower limit value of the color area exists in the image captured by the image capturing section.

12. The image capturing apparatus as set forth in claim 9, wherein
the condition storing section stores a lower limit value of a motion amount which a matching object should have, and
the matching determining section determines whether an object whose motion amount is more than or equal to the lower limit value of the motion amount exists in the image captured by the image capturing section.

13. The image capturing apparatus as set forth in claim 1, further comprising:
an embedded image obtaining section that, when the matching determining section has determined that an object that matches the condition exists, obtains an image of a subject that has a data amount larger than a data amount of the image of the object that matches the condition and is indicated by the object that matches the condition, wherein
the output section, when the matching determining section has determined that an object that matches the condition exists, embeds the image obtained by the embedded image obtaining section to the image captured by the image capturing section, and outputs the embedded result.

14. The image capturing apparatus as set forth in claim 13, further comprising:
an embedded image capturing section that, when the matching determining section has determined that an object that matches the condition exists, captures an image of a subject that has a data amount larger than a data amount of the image of the object that matches the condition and is indicated by the object that matches the condition, wherein the embedded image obtaining section, when the matching determining section has determined that an object that matches the condition exists, obtains the image captured by the embedded image capturing section.

15. The image capturing apparatus as set forth in claim 13, wherein the embedded image obtaining section, when the matching determining section has determined that an object that matches the condition exists, obtains an image of a subject that has an image quality higher than an image quality of an image of the object that matches the condition and is indicated by the object that matches the condition.

16. An image capturing apparatus comprising:

an image capturing section that captures an image;

an output image generating section that generates a small data amount image by reducing a data amount from the image captured by the image capturing section;

a matching determining section that determines whether an object that matches a predetermined condition exists in the image captured by the image capturing section;

an output section that outputs, via a transmission path to a display control apparatus provided outside of the image capturing apparatus, by embedding in the small data amount image, an image of a subject indicated by the object having a data amount larger than a data amount of an image of the object in the small data amount image, when the matching determining section has determined that an object that matches the condition exists;

an object region specifying section that, when the matching determining section has determined that an object that matches the condition exists, specifies an object region including the object that matches the condition, in the image captured by the image capturing section; and a size calculating section that, when the matching determining section has determined that an object that matches the condition exists, calculates a size of the object, wherein the output image generating section includes:

a small data amount image generating section that generates the small data amount image by reducing the data amount of the image captured by the image capturing section, and the output section, when the matching determining section has determined that an object that matches the condition exists, embeds the image of the object region in the image captured by the image capturing section to the small data amount image, and outputs the embedded result, wherein the object region specifying section, when the matching determining section has determined that an object that matches the condition exists, and when the size calculated by the size calculating section is smaller than a predetermined value, specifies an object region including the object that matches the condition, and the output section, when the matching determining section has determined that an object that matches the condition exists, on condition that the size calculated by the size calculating section is smaller than a predetermined value, embeds the image of the object region in the image captured by the image capturing section to the small data amount image generated by the small data amount image generating section, and outputs the embedded result.

17. An image capturing apparatus comprising:

an image capturing section that captures an image;

an output image generating section that generates a small data amount image by reducing a data amount from the image captured by the image capturing section;

a matching determining section that determines whether an object that matches a predetermined condition exists in the image captured by the image capturing section;

an output section that outputs, via a transmission path to a display control apparatus provided outside of the image capturing apparatus, by embedding in the small data amount image, an image of a subject indicated by the object having a data amount larger than a data amount of an image of the object in the small data amount image, when the matching determining section has determined that an object that matches the condition exists;

an object region specifying section that, when the matching determining section has determined that an object that matches the condition exists, specifies an object region including the object that matches the condition, in the image captured by the image capturing section; and an embedded image generating section that, when the matching determining section has determined that an object that matches the condition exists, generates a plurality of embedded images, by dividing the image of the object region in the image captured by the image capturing section into a plurality of partial regions, wherein the output image generating section includes:

a small data amount image generating section that generates the small data amount image by reducing the data amount of the image captured by the image capturing section, and the output section, when the matching determining section has determined that an object that matches the condition exists, embeds the image of the object region in the image captured by the image capturing section to the small data amount image, and outputs the embedded result, wherein the image capturing section successively captures a plurality of images, the small data amount image generating section generates a plurality of small data amount images by reducing a data amount of each of the plurality of images captured by the image capturing section, and the output section, when the matching determining section has determined that an object that matches the condition exists, embeds the image of the object region in the images thinned out by the small data amount image generating section, a) to the small data amount image generated from the image in which an object that matches the condition is determined to exist has been captured, or b) to the small data amount image generated from an image captured by the image capturing section after the image in which an object that matches the condition is determined to exist has been captured and outputs the embedded result, and wherein the output section, when the matching determining section has determined that an object that matches the condition exists, embeds the plurality of embedded images generated by the embedded image generating section to the plurality of small data amount images generated by the small data amount image generating section and outputs the embedded result.

18. The image capturing apparatus as set forth in claim 17, wherein the embedded image generating section generates the plurality of embedded images by dividing the image of the object region into a plurality of partial regions, so that a data amount of the image outputted by the output section is smaller than a permissible data amount permitted to be outputted by the output section.

19. An image capturing apparatus comprising:

an image capturing section that captures an image;

an output image generating section that generates a small data amount image by reducing a data amount from the image captured by the image capturing section;

a matching determining section that determines whether an object that matches a predetermined condition exists in the image captured by the image capturing section;

an output section that outputs, via a transmission path to a display control apparatus provided outside of the image capturing apparatus, by embedding in the small data amount image, an image of a subject indicated by the object having a data amount larger than a data amount of an image of the object in the small data amount image, when the matching determining section has determined that an object that matches the condition exists;

an object region specifying section that, when the matching determining section has determined that an object that matches the condition exists, specifies an object region including the object that matches the condition, in the image captured by the image capturing section; and an embedded image generating section that generates a plurality of images having a different image quality from each other depending on an object feature type, by converting each image of the plurality of object regions in the image captured by the image capturing section, to an image of an image quality in accordance with the type of the feature of an object included in each of the plurality of object regions, wherein the output image generating section includes:

a small data amount image generating section that generates the small data amount image by reducing the data amount of the image captured by the image capturing section, and the output section, when the matching determining section has determined that an object that matches the condition exists, embeds the image of the object region in the image captured by the image capturing section to the small data amount image, and Outputs the embedded result, wherein the object region specifying section, when the matching determining section has determined that a plurality of objects that match the condition exist, specifies a plurality of object regions that respectively include the plurality of objects that match the condition, and wherein the output section, when the matching determining section has determined that a plurality of objects that match the condition exist, embeds the plurality of images generated by the embedded image generating section to the small data amount image generated by the small data amount image generating section, and outputs the embedded result.

20. The image capturing apparatus as set forth in claim 19, further comprising:

a difference image generating section that generates a difference image between each of the plurality of images generated by the embedded image generating section and the image of the object region in the small data amount image generated by the small data amount image generating section, wherein the output section, when the matching determining section has determined that a plurality of objects that match the condition exist, embeds a plurality of difference images generated by the difference image generating section to the small data amount image generated by the small data amount image generating section and outputs the embedded result.

21. An image capturing apparatus comprising:

an image capturing section that captures an image;

an output image generating section that generates a small data amount image by reducing a data amount from the image captured by the image capturing section;

a matching determining section that determines whether an object that matches a predetermined condition exists in the image captured by the image capturing section;

an output section that outputs, via a transmission path to a display control apparatus provided outside of the image capturing apparatus, by embedding in the small data amount image, an image of a subject indicated by the object having a data amount larger than a data amount of an image of the object in the small data amount image, when the matching determining section has determined that an object that matches the condition exists;

an object region specifying section that, when the matching determining section has determined that an object that matches the condition exists, specifies an object region including the object that matches the condition, in the image captured by the image capturing section; and a difference image generating section that generates a difference image between an image of the object region in the image captured by the image capturing section and an image of the object region in the small data amount image generated by the small data amount image generating section, wherein the output image generating section includes:

a small data amount image generating section that generates the small data amount image by reducing the data amount of the image captured by the image capturing section, and the output section, when the matching determining section has determined that an object that matches the condition exists, embeds the image of the object region in the image captured by the image capturing section to the small data amount image, and outputs the embedded result, and wherein the output section, when the matching determining section has determined that an object that matches the condition exists, embeds the difference image generated by the difference image generating section to the small data amount image generated by the small data amount image generating section and outputs the embedded result.

22. An image capturing method comprising:

an image capturing step of capturing an image;

an output image generating step of generating a small data amount image by reducing a data amount from the image captured in the image capturing step;

a matching determining step of determining whether an object that matches a predetermined condition exists in the image captured in the image capturing step;

an output step of outputting, via a transmission path to a display control apparatus provided outside of an image capturing apparatus, by embedding in the small data amount image, an image of a subject indicated by the object having a data amount larger than a data amount of an image of the object in the small data amount image, when an object that matches the condition is determined to exist in the matching determining step;

an object region specifying step of specifying, when the matching determining step has determined that an object that matches the condition exists, that an object region including the object that matches the condition in the image captured by the image capturing step;

a frequency component calculating step of calculating a space frequency component of each of a plurality of regions in the image captured by the image capturing step; and an embedded region specifying step of specifying, as an embedded region, a region having a frequency component lower than a predetermined value in a predetermined frequency region from among the plurality of regions in the image captured by the image capturing step, based on the space frequency component calculated by the frequency component calculating step, wherein the output image generating step includes:

a small data amount image generating step of generating the small data amount image by reducing the data amount of the image captured by the image capturing step, and the output step, when the matching determining step has determined that an object that matches the condition exists, embeds the image of the object region in the image captured by the image capturing step to the small data amount image, and outputs the embedded result, wherein the output step, when the matching determining step has determined that an object that matches the condition exists, embeds the image of the object region to the small data amount image generated by the small data amount image generating step, by means of digital watermarking, and outputs the embedded result, and wherein the output step, when the matching determining step has determined that an object that matches the condition exists, embeds the image of the object region to the embedded region of the small data amount image generated by the small data amount image generating step, by means of digital watermarking, and outputs the embedded result.

23. A non-transitory computer readable medium containing executable instructions, wherein the instructions cause a processor to capture an image;

generate a small data amount image by reducing a data amount from the captured image;

determine whether an object that matches a predetermined condition exists in the captured image;

output, via a transmission path to a display control apparatus provided outside of an image capturing apparatus, by embedding in the small data amount image, an image of a subject indicated by the object having a data amount larger than a data amount of an image of the object in the small data amount image, when it is determined that an object that matches the condition exists;

specify, when said determining step has determined that an object that matches the condition exists, that an object region including the object that matches the condition, in the captured image;

calculate a space frequency component of each of a plurality of regions in the captured image captured; and specify, as an embedded region, a region having a frequency component lower than a predetermined value in a predetermined frequency region from among the plurality of regions in the captured image, based on the space frequency component calculated by the calculating step, wherein the generating step generates the small data amount image by reducing the data amount of the captured image, and the outputting step, when the determining step has determined that an object that matches the condition exists, embeds the image of the object region in the captured image to the small data amount image, and outputs the embedded result, wherein the outputting step, when the determining step has determined that an object that matches the condition exists, embeds the image of the object region to the small data amount image generated by the generating step, by means of digital watermarking, and outputs the embedded result, and wherein the outputting step, when the determining step has determined that an object that matches the condition exists, embeds the image of the object region to the embedded region of the small data amount image generated by generating step, by means of digital watermarking, and outputs the embedded result.

* * * * *